United States Patent
Frye et al.

(10) Patent No.: US 12,453,771 B2
(45) Date of Patent: *Oct. 28, 2025

(54) METHODS OF TREATING CANCER USING ANTI-CD137 ANTIBODIES

(71) Applicant: Eli Lilly and Company, Indianapolis, IN (US)

(72) Inventors: Christopher Carl Frye, Bargersville, IN (US); Michael Dewain Kalos, Brooklyn, NY (US); Helen Kotanides, Norwalk, CT (US); Stephanie Lynn Sandefur, Indianapolis, IN (US)

(73) Assignee: ELI LILLY AND COMPANY, Indianapolis, IN (US)

(*) Notice: Subject to any disclaimer, the term of this patent is extended or adjusted under 35 U.S.C. 154(b) by 84 days.

This patent is subject to a terminal disclaimer.

(21) Appl. No.: 18/051,761

(22) Filed: Nov. 1, 2022

(65) Prior Publication Data

US 2023/0279134 A1   Sep. 7, 2023

Related U.S. Application Data

(60) Division of application No. 16/750,842, filed on Jan. 23, 2020, now Pat. No. 11,512,134, which is a continuation of application No. 16/497,493, filed as application No. PCT/US2018/043632 on Jul. 25, 2018, now Pat. No. 10,906,983.

(60) Provisional application No. 62/539,687, filed on Aug. 1, 2017.

(51) Int. Cl.
*A61K 39/395* (2006.01)
*C07K 16/28* (2006.01)

(52) U.S. Cl.
CPC ...... *A61K 39/3955* (2013.01); *C07K 16/2878* (2013.01); *C07K 2317/21* (2013.01); *C07K 2317/565* (2013.01); *C07K 2317/75* (2013.01)

(58) Field of Classification Search
None
See application file for complete search history.

(56) References Cited

U.S. PATENT DOCUMENTS

| | | |
|---|---|---|
| 6,210,669 B1 | 4/2001 | Aruffo et al. |
| 6,303,121 B1 | 10/2001 | Kwon |
| 6,355,779 B1 | 3/2002 | Goodwin et al. |
| 6,569,997 B1 | 5/2003 | Kwon |
| 6,974,863 B2 | 12/2005 | Kwon |
| 7,288,638 B2 | 10/2007 | Jure-Kunkel et al. |
| 7,651,686 B2 | 1/2010 | Chen et al. |
| 8,163,550 B2 | 4/2012 | Chen et al. |
| 8,337,850 B2 | 12/2012 | Ahrens et al. |
| 8,475,790 B2 | 7/2013 | Jure-Kunkel |
| 8,772,026 B2 | 7/2014 | Chen et al. |
| 10,689,454 B2 | 6/2020 | Ellmark et al. |
| 10,906,983 B2 | 2/2021 | Frye et al. |
| 2015/0210769 A1 | 7/2015 | Freeman et al. |
| 2016/0244528 A1 | 8/2016 | Gray et al. |

FOREIGN PATENT DOCUMENTS

| | | |
|---|---|---|
| WO | 2003049755 A1 | 6/2003 |
| WO | 2015/119923 A1 | 8/2015 |
| WO | 2016/029073 A2 | 2/2016 |
| WO | 2017/025016 A1 | 2/2017 |
| WO | 2017/034916 A1 | 3/2017 |

OTHER PUBLICATIONS

Hubbi et al., Regulation of cell proliferation by hypoxia-inducible factors, Am. J. Physiol. Cell Physiol. 309: C775-C782, 2015.*
Bio X Cell, Catalog #BE0169, "Anti-mouse 4-1bb antibody BE0169," 2022. Retrieved online: <URL: https://bxcell.com/product/tm-cd137/>, retrieved on Mar. 2, 2022.
Deutscher, M.P. "[8] Maintaining protein stability," Methods in Enzymology, vol. 182, Academic Press, 1990, pp. 83-89.
Emsley, P. et al., "Features and development of Coot," Acta Crystallographica Section D: Biological Crystallography, 66.4, 2010, pp. 486-501.
Fisher, T.S. et al., "Targeting of 4-1BB by monoclonal antibody PF-05082566 enhances T-cell function and promotes anti-tumor activity," Cancer Immunology Immunotherapy 2012, 61(10): 1721-1733.
Guo, Z. et al., "Combined TIM-3 blockade and CD137 activation affords the long-term protection in a murine model of ovarian cancer." Journal of Translational Medicine 2013, 11(1): 215, 11 pages.
Hurtado et al., "Signals through 4-1BB are costimulatory to previously activated splenic T cells and inhibit activation-induced cell death," J Immunol 1997, 158 (6), pp. 2600-2609.
International Search Report of PCT/US2018/043632 (filed Jul. 25, 2018 by Eli Lilly and Company), Mailed by the European Patent Office on Oct. 25, 2018; search completed Oct. 5, 2018, 6 pages.
Written Opinion of the International Search Authority of PCT/US2018/043632 (filed Jul. 25, 2018 by Eli Lilly and Company), Mailed by the European Patent Office on Oct. 25, 2018; search completed Oct. 5, 2018, 6 pages.
Kotanides et al., "Characterization of 7A5: A Human CD137 (4-1BB) Receptor Binding Monoclonal Antibody with Differential Agonist Properties That Promotes Antitumor Immunity." Mol Cancer Ther. 2020, 19(4), pp. 988-998.
Kunik et al., "Structural consensus among antibodies defines the antigen binding site," PLoS Comput. Biol. 2012, 8(2):e 1002388, doi: 10.1371/journal.pcbi.1002388.

(Continued)

*Primary Examiner* — Claire Kaufman
(74) *Attorney, Agent, or Firm* — Quarles & Brady, LLP

(57) ABSTRACT

The present invention relates to antibodies that bind to human CD137 and display agonist activity, and are useful for treating solid and hematological tumors alone and in combination with chemotherapy and ionizing radiation.

13 Claims, No Drawings
Specification includes a Sequence Listing.

(56) References Cited

OTHER PUBLICATIONS

Kwon et al., "4-1BB: Still in the midst of darkness," Molecules and Cells; Seoul, 2000, vol. 10, Iss. 2, pp. 119-126.
Kwon et al., "cDNA sequences of two inducible T-cell genes," Proc Natl Acad Sci U S A. 1989, 86(6): pp. 1963-1967.
Li et al., "Limited cross-linking of 4-1BB by 4-1BB ligand and the agonist monoclonal antibody utomilumab," Cell Reports, 2018, 25, pp. 909-920.
MacCallum et al., "Antibody-antigen interactions: contact analysis and binding site topography," J. Mol. Biol. 1996, 262:732-745.
McCoy, A.J. et al., "Phaser crystallographic software," Journal of Applied Crystallography, 40.4, 2007, pp. 658-674.
McGray et al., "Combined vaccination and immunostimulatory antibodies provides durable cure of murine melanoma and induces transcriptional changes associated with positive outcome in human melanoma patients," Oncoimmunoglogy, 2012, vol. 1, No. 4, pp. 419-431.
Melero, I. et al., "Monoclonal antibodies aganist the 4-1BB T-cell activation molecule eradicate established tumors," Nature Medicine, 1997, 3.6, pp. 682.
Murshudov, G.N. et al., "REFMAC5 for the refinement of macromolecular crystal structures," Acta Crystallographica Section D: Biological Crystallography, 2011, 67.4, pp. 355-367.
North, B. et al., "A New Clustering of Antibody CDR Loop Conformations," Journal of Molecular Biology, 2011, 406, pp. 228-256.
Perez-Ruiz et al., Anti-CD137 and PD-1/PD-L1 Antibodies En Route toward Clinical Synergy. Clin Cancer Res, 2017, vol. 23, Issue 18, pp. 5326-5328.
Robinson et al., "Abstract 3973: Effects of anti-PD-1 and anti-4-1BB antibody treatment on melanoma-specific T cells in a murine model of melanoma," Cancer Res, 2013, vol. 73.
Segal, N.H. et al., "Results from an integrated safety analysis of urelumab, an agonist anti-CD137 monoclonal antibody," Clinical Cancer Research, 2017, 23.8, pp. 1929-1936.
Shuford et al., "4-1BB costimulatory signals preferentially induce CD8+ T cell proliferation and lead to the amplification in vivo of cytotoxic T cell responses," J Exp Med. 1997; 186(1):47-55.
Tolcher et al., "Phase 1b Study of Utomilumab (PF-05082566, a 4-1BB/CD137 Agonist, in Combination with Pembrolizumab (MK-3475) in Patients with Advanced Solid Tumors", Clin. Cancer Res., 2017 DOI: 10.1158/1078-0432. CCR-17-1243.
Verbrugge et al., "Radiotherapy increases the permissiveness of established mammory tumors to rejection by immunomodulatory antibodies," Cancer Res., 2012, 72(13), pp. 3163-3174.
Winn, M.D. et al., "Overview of the CCP4 suite and current developments," Acta Crystallographica Section D: Biological Crystallography, 2011, 67.4, pp. 235-242.

\* cited by examiner

METHODS OF TREATING CANCER USING ANTI-CD137 ANTIBODIES

CROSS-REFERENCE TO RELATED APPLICATIONS

This application is a divisional of U.S. application Ser. No. 16/750,842, filed Jan. 23, 2020, which application is a continuation of U.S. application Ser. No. 16/497,493, filed Sep. 25, 2019, now U.S. Pat. No. 10,906,983, issued on Feb. 2, 2021, which application is a national stage filing under 35 U.S.C. 371 of International Application No. PCT/US2018/043632, filed on Jul. 25, 2018, which in turn claims the benefit of priority to U.S. Provisional Patent Application No. 62/539,687, filed on Aug. 1, 2017. All of the previously filed applications listed here are incorporated herein by reference in their entirety.

REFERENCE TO A SEQUENCE LISTING

This application is being filed electronically via Patent Center and includes an electronically submitted Sequence Listing in .xml format. The .xml file contains a sequence listing entitled "083389_01850.xml" created on May 18, 2023, and having a size of 32,884 bytes. The Sequence Listing contained in this .xml file is part of the Specification and is incorporated herein by reference in its entirety.

The present invention is in the field of medicine. Particularly, the present invention relates to agonistic antibodies directed to human CD137, compositions comprising such agonistic anti-human CD137 antibodies, and methods of using such agonistic anti-human CD137 antibodies for the treatment of solid and hematological tumors alone or in combination with chemotherapy and other cancer therapeutics.

It is now known that boosting the anti-tumor immune response can be an effective means of cancer therapy. In this regard, CD137, also known as 4-1BB, belongs to the TNF receptor family and plays a role in the activation of T cell immune responses such as by driving T cell proliferation and effector functions, promoting immunological memory, and inhibiting activation-induced cell death. Agonistic antibodies targeting CD137 have shown promise in murine tumor models as a monotherapy (Melero. I. et al., *Nat. Med.* 3(6):682-685 (1997)), however, agonist antibodies targeting human CD137 have not yet demonstrated sufficient responses as a monotherapy or combination therapy in human patients. In this regard, neither utomilumab (a fully human CD137 agonist IgG2 mAb) (Fisher, T. M. et al, *Cancer Immunol. Immunother.* (2012) 61:1721-1733) nor urelumab (a humanized CD137 agonist IgG4 mAb) (Segal, N. H. *Clin. Cancer Res.* (2017) 23(8):1929-1936) have received regulatory approvals for use as a monotherapy or even as a combination therapy. Indeed, no agonistic antibody targeting human CD137 has been approved for therapeutic use in humans.

Thus, there exists a need for additional fully human antibodies that agonize the human CD137 receptor and promote a robust anti-cancer immune response, but with acceptable toxiciticy profiles. There also remains a need for alternative anti-human agonistic CD137 antibodies that can be combined with other therapeutics for the treatment of cancer. In particular, there also remains a need for anti-human CD137 antibodies that display sufficient potency as a cancer monotherapy and/or combination therapy.

Without being limited to theory, it is believed that the use of current agonistic antibodies targeting CD137 as a cancer monotherapy and/or combination agent is hampered by factors such as the agonistic strength of said antibodies and the immune-related adverse events that result from their use at higher, potentially efficacious doses. In particular, current antibodies are either too potent, leading to adverse events, or display sub-optimal efficacy.

The anti-human CD137 agonistic antibodies described herein are fully human, Fcγ-receptor-mediated effector null antibodies that bind human CD137 and cynomolgus monkey CD137, stimulate T cell activation in vitro, promote human CD137 cell surface expression, enhance NF-kappa B activity, inhibit tumor growth in murine tumor models of non-small cell lung cancer as a monotherapy, inhibit T-regulatory cell mediated suppression in vitro, activate immune gene signatures, increase the frequency of intratumoral $CD3^+$ T cells, compete with human CD137-Ligand for binding to human CD137, and bind to unique amino acid residues on human CD137.

The present disclosure provides an anti-human CD137 (SEQ ID NO:1) antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7.

The present disclosure provides an antibody comprising a heavy chain variable region having the amino acid sequence of SEQ ID NO: 8 and a light chain variable region having the amino acid sequence of SEQ ID NO: 9. The present disclosure provides an antibody comprising a heavy chain variable region having the amino acid sequence of SEQ ID NO: 8 and a light chain variable region having the amino acid sequence of SEQ ID NO: 12.

The present disclosure provides an antibody comprising a heavy chain having the amino acid sequence of SEQ ID NO: 10 and a light chain having the amino acid sequence of SEQ ID NO: 11. The present disclosure provides an antibody comprising a heavy chain having the amino acid sequence of SEQ ID NO: 10 and a light chain having the amino acid sequence of SEQ ID NO: 13.

The present disclosure provides a mammalian cell capable of expressing an antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO: 6, and LCDR3 having the amino acid sequence of SEQ ID NO:7.

The present disclosure provides a mammalian cell capable of expressing an antibody comprising a heavy chain having the amino acid sequence of SEQ ID NO: 10 and a light chain having the amino acid sequence of SEQ ID NO: 11 or the amino acid sequence of SEQ ID NO: 13.

The present disclosure provides a process for producing an antibody comprising cultivating a mammalian cell capable of expressing the antibody and recovering the antibody; wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO: 6, and LCDR3 having the amino acid sequence of SEQ ID NO: 7.

The present disclosure provides a process for producing an antibody comprising cultivating a mammalian cell capable of expressing the antibody and recovering the antibody; wherein the antibody comprises a heavy chain having the amino acid sequence of SEQ ID NO: 10 and a light chain having the amino acid sequence of SEQ ID NO: 11 or the amino acid sequence of SEQ ID NO: 13.

The present disclosure provides an antibody produced by a process comprising cultivating a mammalian cell capable of expressing the antibody and recovering the antibody; wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO: 6, and LCDR3 having the amino acid sequence of SEQ ID NO: 7. The present disclosure provides an antibody produced by a process comprising cultivating a mammalian cell capable of expressing the antibody and recovering the antibody; wherein the antibody comprises a heavy chain having the amino acid sequence of SEQ ID NO: 10 and a light chain having the amino acid sequence of SEQ ID NO: 11 or the amino acid sequence of SEQ ID NO: 13.

The present disclosure provides a DNA molecule comprising a polynucleotide having the sequence of SEQ ID NO:14 and one of SEQ ID NO:15, SEQ ID NO:16, or SEQ ID NO:17. The present disclosure provides a DNA molecule comprising a polynucleotide having the sequence of SEQ ID NO:14, SEQ ID NO:15, SEQ ID NO:16, or SEQ ID NO:17. The present disclosure provides a mammalian cell comprising a DNA molecule comprising a polynucleotide having the sequence of SEQ ID NO:14 and one of SEQ ID NO:15, SEQ ID NO:16, or SEQ ID NO:17. The present disclosure provides a mammalian cell comprising a DNA molecule comprising a polynucleotide having the sequence of SEQ ID NO:14, SEQ ID NO:15, SEQ ID NO:16, or SEQ ID NO:17.

The present disclosure provides a pharmaceutical composition comprising an antibody disclosed herein and an acceptable carrier, diluent, or excipient. The present disclosure provides a pharmaceutical composition comprising an antibody and an acceptable carrier, diluent, or excipient; wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7. The present disclosure provides a pharmaceutical composition comprising an antibody and an acceptable carrier, diluent, or excipient; wherein the antibody comprises a heavy chain variable region having the amino acid sequence of SEQ ID NO: 8 and a light chain variable region having the amino acid sequence of SEQ ID NO: 9. The present disclosure provides a pharmaceutical composition comprising an antibody and an acceptable carrier, diluent, or excipient; wherein the antibody comprises a heavy chain variable region having the amino acid sequence of SEQ ID NO: 8 and a light chain variable region having the amino acid sequence of SEQ ID NO: 12. The present disclosure provides a pharmaceutical composition comprising an antibody and an acceptable carrier, diluent, or excipient; wherein the antibody comprises a heavy chain having the amino acid sequence of SEQ ID NO: 10 and a light chain having the amino acid sequence of SEQ ID NO: 11. The present disclosure provides a pharmaceutical composition comprising an antibody and an acceptable carrier, diluent, or excipient; wherein the antibody comprises a heavy chain having the amino acid sequence of SEQ ID NO: 10 and a light chain having the amino acid sequence of SEQ ID NO: 13.

The present disclosure provides a method of treating cancer, comprising administering to a patient in need thereof, an effective amount of an anti-human CD137 (SEQ ID NO:1) antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 9. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 12. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 11. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 13.

The present disclosure provides a method of treating cancer, comprising administering to a patient in need thereof, an effective amount of an anti-human CD137 (SEQ ID NO:1) antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 9; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 12; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 11; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 13; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides a method of treating cancer, comprising administering to a patient in need thereof, an effective amount of an anti-human CD137 (SEQ ID NO:1) antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the cancer is cholangiocarcinoma, head and neck squamous cell carcinoma, lung adenocarcinoma, lung squamous cell carcinoma, clear cell renal carcinoma, or head and neck squamous cell carcinoma.

The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 9; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 12; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 11; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 13; wherein the cancer is cholangiocarcinoma, head and neck squamous cell carcinoma, lung adenocarcinoma, lung squamous cell carcinoma, clear cell renal carcinoma, or head and neck squamous cell carcinoma.

The present disclosure provides a method of treating cancer, comprising administering to a patient in need thereof, an effective amount of an anti-human CD137 (SEQ ID NO:1) antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the antibody is administered in simultaneous, separate, or sequential combination with ionizing radiation. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 9; wherein the antibody is administered in simultaneous, separate, or sequential combination with ionizing radiation. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 12; wherein the antibody is administered in simultaneous, separate, or sequential combination with ionizing radiation. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 11; wherein the antibody is administered in simultaneous, separate, or sequential combination with ionizing radiation. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 13; wherein the antibody is administered in simultaneous, separate, or sequential combination with ionizing radiation.

The present disclosure provides a method of treating cancer, comprising administering to a patient in need thereof, an effective amount of an anti-human CD137 (SEQ ID NO:1) antibody comprising HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the antibody is administered in simultaneous, separate, or sequential combination with one or more chemotherapeutic agents. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 9; wherein the antibody is administered in simultaneous, separate, or sequential combination with one or more chemotherapeutic agents. The present disclosure provides a method of treating cancer, comprising administering to a patient in need thereof, an effective amount of an antibody comprising a heavy chain variable region having the amino acid sequence of SEQ ID NO: 8 and a light chain variable region having the amino acid sequence of SEQ ID NO: 12; wherein the antibody is administered in simultaneous, separate, or sequential combination with one or more chemotherapeutic agents. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 11; wherein the antibody is administered in simultaneous, separate, or sequential combination with one or more chemotherapeutic agents. The present disclosure provides a method of treating cancer, comprising administering to a patient in need thereof, an effective amount of an antibody comprising a heavy chain having the amino acid sequence of SEQ ID NO: 10 and a light chain having the amino acid sequence of SEQ ID NO: 13; wherein the antibody is administered in simultaneous, separate, or sequential combination with one or more chemotherapeutic agents.

The present disclosure provides an antibody disclosed herein for use in the treatment of cancer; wherein the cancer is bladder cancer. The present disclosure provides an antibody disclosed herein for use in the treatment of cancer; wherein the cancer is breast cancer. The present disclosure provides an antibody disclosed herein for use in the treatment of cancer; wherein the cancer is biliary tract cancer. The present disclosure provides an antibody disclosed herein for use in the treatment of cancer; wherein the cancer is colon cancer. The present disclosure provides an antibody disclosed herein for use in the treatment of cancer; wherein the cancer is endometrial cancer. The present disclosure provides an antibody disclosed herein for use in the treatment of cancer; wherein the cancer is esophageal cancer. The present disclosure provides an antibody disclosed herein for use in the treatment of cancer; wherein the cancer is gastric cancer. The present disclosure provides an antibody disclosed herein for use in the treatment of cancer; wherein the cancer is head and neck cancer. The present disclosure provides an antibody disclosed herein for use in the treatment of cancer; wherein the cancer is non-small cell lung cancer. The present disclosure provides an antibody disclosed herein for use in the treatment of cancer; wherein the cancer is prostate cancer. The present disclosure provides an antibody disclosed herein for use in the treatment of cancer; wherein the cancer is rectal cancer. The present disclosure provides an antibody disclosed herein for use in the treatment of cancer; wherein the cancer is thyroid cancer. The present disclosure provides an antibody disclosed herein for use in the treatment of cancer; wherein the cancer is head and neck squamous cell carcinoma. The present disclosure provides an antibody disclosed herein for use in the treatment of cancer; wherein the cancer is renal cell carcinoma. The present disclosure provides an antibody disclosed herein for use in the treatment of cancer; wherein the cancer is cholangiocarcinoma. The present disclosure provides an antibody disclosed herein for use in the treatment of cancer; wherein the cancer is lung adenocarcinoma. The present disclosure provides an antibody disclosed herein for use in the treatment of cancer; wherein the cancer is lung squamous cell carcinoma. The present disclosure provides an antibody disclosed herein for use in the treatment of cancer; wherein the cancer is clear cell renal carcinoma.

The present disclosure provides the use of an antibody disclosed herein for the manufacture of a medicament for the treatment of cancer; wherein the cancer is bladder cancer. The present disclosure provides the use of an antibody disclosed herein for the manufacture of a medicament for the treatment of cancer; wherein the cancer is breast cancer. The present disclosure provides the use of an antibody disclosed herein for the manufacture of a medicament for the treatment of cancer; wherein the cancer is biliary tract cancer. The present disclosure provides the use of an antibody disclosed herein for the manufacture of a medicament for the treatment of cancer; wherein the cancer is colon cancer. The present disclosure provides the use of an antibody disclosed herein for the manufacture of a medicament for the treatment of cancer; wherein the cancer is endometrial cancer. The present disclosure provides the use of an antibody disclosed herein for the manufacture of a medicament for the treatment of cancer; wherein the cancer is esophageal cancer. The present disclosure provides the use of an antibody disclosed herein for the manufacture of a medicament for the treatment of cancer; wherein the cancer is gastric cancer. The present disclosure provides the use of an antibody disclosed herein for the manufacture of a medicament for the treatment of cancer; wherein the cancer is head and neck cancer. The present disclosure provides the use of an antibody disclosed herein for the manufacture of a medicament for the treatment of cancer; wherein the cancer is non-small cell lung cancer. The present disclosure provides the use of an antibody disclosed herein for the manufacture of a medicament for the treatment of cancer; wherein the cancer is prostate cancer. The present disclosure provides the use of an antibody disclosed herein for the manufacture of a medicament for the treatment of cancer; wherein the cancer is rectal cancer. The present disclosure provides the use of an antibody disclosed herein for the manufacture of a medicament for the treatment of cancer; wherein the cancer is thyroid cancer. The present disclosure provides the use of an antibody disclosed herein for the manufacture of a medicament for the treatment of cancer; wherein the cancer is head and neck squamous cell carcinoma. The present disclosure provides the use of an antibody disclosed herein for the manufacture of a medicament for the treatment of cancer; wherein the cancer is renal cell carcinoma. The present disclosure provides the use of an antibody disclosed herein for the manufacture of a medicament for the treatment of cancer; wherein the cancer is cholangiocarcinoma. The present disclosure provides the use of an antibody disclosed herein for the manufacture of a medicament for the treatment of cancer; wherein the cancer is lung adenocarcinoma. The present disclosure provides the use of an antibody disclosed herein for the manufacture of a medicament for the treatment of cancer; wherein the cancer is lung squamous cell carcinoma. The present disclosure provides the use of an antibody disclosed herein for the manufacture of a medicament for the treatment of cancer; wherein the cancer is clear cell renal carcinoma.

The present disclosure provides an anti-human CD137 (SEQ ID NO:1) antibody disclosed herein for use in therapy. The present disclosure provides an anti-human CD137 (SEQ ID NO:1) antibody disclosed herein for use in therapy; wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7. The present disclosure provides an anti-human CD137 (SEQ ID NO:1) antibody disclosed herein for use in therapy; wherein the antibody comprises a heavy chain having the amino acid sequence of SEQ ID NO: 10 and a light chain having the amino acid sequence of SEQ ID NO: 11. The present disclosure provides an anti-human CD137 (SEQ ID NO:1) antibody disclosed herein for use in therapy; wherein the antibody comprises a heavy chain having the amino acid sequence of SEQ ID NO: 10 and a light chain having the amino acid sequence of SEQ ID NO: 13.

The present disclosure provides an anti-human CD137 (SEQ ID NO:1) antibody for use in the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 9. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 12. The present disclosure provides an antibody for use in the treatment of cancer, wherein the antibody comprises a heavy chain having the amino acid sequence of SEQ ID NO: 10 and a light chain having the amino acid sequence of SEQ ID NO: 11. The present disclosure provides an antibody for use in the treatment of cancer, wherein the antibody comprises a heavy chain having the amino acid sequence of SEQ ID NO: 10 and a light chain having the amino acid sequence of SEQ ID NO: 13.

The present disclosure provides an anti-human CD137 (SEQ ID NO:1) antibody for use in the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 9; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 12; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody for use in the treatment of cancer, wherein the antibody comprises a heavy chain having the amino acid sequence of SEQ ID NO: 10 and a light chain having the amino acid sequence of SEQ ID NO: 11; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody for use in the treatment of cancer, wherein the antibody comprises a heavy chain having the amino acid sequence of SEQ ID NO: 10 and a light chain having the amino acid sequence of SEQ ID NO: 13; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides an anti-human CD137 (SEQ ID NO:1) antibody for use in the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 9; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 12; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides an antibody for use in the treatment of cancer, wherein the antibody comprises a heavy chain having the amino acid sequence of SEQ ID NO: 10 and a light chain having the amino acid sequence of SEQ ID NO: 11; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides an antibody for use in the treatment of cancer, wherein the antibody comprises a heavy chain having the amino acid sequence of SEQ ID NO: 10 and a light chain having the amino acid sequence of SEQ ID NO: 13; wherein the cancer is cholangiocarcinoma, head and neck squamous cell carcinoma, lung adenocarcinoma, lung squamous cell carcinoma, clear cell renal carcinoma, or head and neck squamous cell carcinoma.

The present disclosure provides an anti-human CD137 (SEQ ID NO:1) antibody for use in the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the antibody is administered in simultaneous, separate, or sequential combination with ionizing radiation. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 9; wherein the antibody is administered in simultaneous, separate, or sequential combination with ionizing radiation. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 12; wherein the antibody is administered in simultaneous, separate, or sequential combination with ionizing radiation. The present disclosure provides an antibody for use in the treatment of cancer, wherein the antibody comprises a heavy chain having the amino acid sequence of SEQ ID NO: 10 and a light chain having the amino acid sequence of SEQ ID NO: 11; wherein the antibody is administered in simultaneous, separate, or sequential combination with ionizing radiation. The present disclosure provides an antibody for use in the treatment of cancer, wherein the antibody comprises a heavy chain having the amino acid sequence of SEQ ID NO: 10 and a light chain having the amino acid sequence of SEQ ID NO: 13; wherein the antibody is administered in simultaneous, separate, or sequential combination with ionizing radiation.

The present disclosure provides an anti-human CD137 (SEQ ID NO:1) antibody for use in the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the antibody is administered in simultaneous, separate, or sequential combination with one or more chemotherapeutic agents. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 9; wherein the antibody is administered in simultaneous, separate, or sequential combination with one or more chemotherapeutic agents. The present disclosure provides an antibody for use in the treatment of cancer, wherein the antibody comprises a heavy chain variable region having the amino acid sequence of SEQ ID NO: 8 and a light chain variable region having the amino acid sequence of SEQ ID NO: 12; wherein the antibody is administered in simultaneous, separate, or sequential combination with one or more chemotherapeutic agents. The present disclosure provides an antibody for use in the treatment of cancer, wherein the antibody comprises a heavy chain having the amino acid sequence of SEQ ID NO: 10 and a light chain having the amino acid sequence of SEQ ID NO: 11; wherein the antibody is administered in simultaneous, separate, or sequential combination with one or more chemotherapeutic agents. The present disclosure provides an antibody for use in the treatment of cancer, wherein the antibody comprises a heavy chain having the amino acid sequence of SEQ ID NO: 10 and a light chain having the amino acid sequence of SEQ ID NO: 13; wherein the antibody is administered in simultaneous, separate, or sequential combination with one or more chemotherapeutic agents.

The present disclosure provides the use of an anti-human CD137 (SEQ ID NO:1) antibody for the manufacture of a medicament for the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 9. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 12. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 11. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 13.

The present disclosure provides the use of an anti-human CD137 (SEQ ID NO:1) antibody for the manufacture of a medicament for the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 9; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 12; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 11; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 13; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides the use of an anti-human CD137 (SEQ ID NO:1) antibody for the manufacture of a medicament for the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 9; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 12; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 11; wherein the cancer is cholangiocarcinoma, head and neck squamous cell carcinoma, lung adenocarcinoma, lung squamous cell carcinoma, clear cell renal carcinoma, or head and neck squamous cell carcinoma. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 13; wherein the cancer is cholangiocarcinoma, head and neck squamous cell carcinoma, lung adenocarcinoma, lung squamous cell carcinoma, clear cell renal carcinoma, or head and neck squamous cell carcinoma.

The present disclosure provides the use of an anti-human CD137 (SEQ ID NO:1) antibody for the manufacture of a medicament for the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the antibody is administered in simultaneous, separate, or sequential combination with ionizing radiation. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 9; wherein the antibody is administered in simultaneous, separate, or sequential combination with ionizing radiation. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 12; wherein the antibody is administered in simultaneous, separate, or sequential combination with ionizing radiation. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 11; wherein the antibody is administered in simultaneous, separate, or sequential combination with ionizing radiation. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 13; wherein the antibody is administered in simultaneous, separate, or sequential combination with ionizing radiation.

The present disclosure provides the use of an anti-human CD137 (SEQ ID NO:1) antibody for the manufacture of a medicament for the treatment of cancer, wherein the antibody comprises HCDR1 having the amino acid sequence of SEQ ID: 2, HCDR2 having the amino acid sequence of SEQ ID NO: 3, HCDR3 having the amino acid sequence of SEQ ID NO: 4, LCDR1 having the amino acid sequence of SEQ ID NO: 5, LCDR2 having the amino acid sequence of SEQ ID NO:6, and LCDR3 having the amino acid sequence of SEQ ID NO: 7; wherein the antibody is administered in simultaneous, separate, or sequential combination with one or more chemotherapeutic agents. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 9; wherein the antibody is administered in simultaneous, separate, or sequential combination with one or more chemotherapeutic agents. The present disclosure provides the use of an antibody for the manufacture of a medicament for the treatment of cancer, wherein the antibody comprises a heavy chain variable region having the amino acid sequence of SEQ ID NO: 8 and a light chain variable region having the amino acid sequence of SEQ ID NO: 12; wherein the antibody is administered in simultaneous, separate, or sequential combination with one or more chemotherapeutic agents. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 11; wherein the antibody is administered in simultaneous, separate, or sequential combination with one or more chemotherapeutic agents. The present disclosure provides the use of an antibody for the manufacture of a medicament for the treatment of cancer, wherein the antibody comprises a heavy chain having the amino acid sequence of SEQ ID NO: 10 and a light chain having the amino acid sequence of SEQ ID NO: 13; wherein the antibody is administered in simultaneous, separate, or sequential combination with one or more chemotherapeutic agents.

The present disclosure provides an antibody that agonizes human CD137 (SEQ ID NO: 1) or a pharmaceutical composition comprising the antibody, wherein the antibody contacts human CD137 on at least one of the following amino acid residues: 55, 59, 63, 66, 72, 93-103 (inclusive); optionally, wherein the antibody contacts at least two of the residues, preferably at least three of the resides, more preferably at least four of the residues; more preferably at least five of the residues; more preferably at least six of the residues; more preferably at least seven of the residues; more preferably at least eight of the residues; more preferably at least nine of the residues; more preferably at least ten of the residues; more preferably at least eleven of the residues; more preferably at least twelve of the residues; more preferably at least thirteen of the residues; more preferably at least fourteen of the residues; more preferably at least fifteen of the residues; or more preferably all of the residues. The present disclosure provides an antibody that agonizes human CD137 (SEQ ID NO: 1) or a pharmaceutical composition comprising the antibody, wherein the antibody contacts human CD137 on at least one of the following amino acid residues: 55, 59, 63, 66, 72, 93-103 (inclusive); optionally, wherein the antibody contacts at least two of the residues, preferably at least three of the resides, more preferably at least four of the residues; more preferably at least five of the residues; more preferably at least six of the residues; more preferably at least seven of the residues; more preferably at least eight of the residues; more preferably at least nine of the residues; more preferably at least ten of the residues; more preferably at least eleven of the residues; more preferably at least twelve of the residues; more preferably at least thirteen of the residues; more preferably at least fourteen of the residues; more preferably at least fifteen of the residues; or more preferably all of the residues; wherein contact is determined by X-ray crystallography and wherein the residues in contact are within six (6) angstroms or less of the antibody.

The present disclosure provides the use of an antibody that agonizes human CD137 (SEQ ID NO: 1) for the treatment of cancer or for the manufacture of a medicament for the treatment of cancer, wherein the antibody contacts human CD137 on at least one of the following amino acid residues: 55, 59, 63, 66, 72, 93-103 (inclusive); optionally, wherein the antibody contacts at least two of the residues, preferably at least three of the resides, more preferably at least four of the residues; more preferably at least five of the residues; more preferably at least six of the residues; more preferably at least seven of the residues; more preferably at least eight of the residues; more preferably at least nine of the residues; more preferably at least ten of the residues; more preferably at least eleven of the residues; more preferably at least twelve of the residues; more preferably at least thirteen of the residues; more preferably at least fourteen of the residues; more preferably at least fifteen of the residues; or more preferably all of the residues. The present disclosure provides the use of an antibody that agonizes human CD137 (SEQ ID NO: 1) for the treatment of cancer or for the manufacture of a medicament for the treatment of cancer, wherein the antibody contacts human CD137 on at least one of the following amino acid residues: 55, 59, 63, 66, 72, 93-103 (inclusive); optionally, wherein the antibody contacts at least two of the residues, preferably at least three of the resides, more preferably at least four of the residues; more preferably at least five of the residues; more preferably at least six of the residues; more preferably at least seven of the residues; more preferably at least eight of the residues; more preferably at least nine of the residues; more preferably at least ten of the residues; more preferably at least eleven of the residues; more preferably at least twelve of the residues; more preferably at least thirteen of the residues; more preferably at least fourteen of the residues; more preferably at least fifteen of the residues; or more preferably all of the residues; wherein contact is determined by X-ray crystallography and wherein the residues in contact are within six (6) angstroms or less of the antibody.

The present disclosure provides an antibody that agonizes human CD137 (SEQ ID NO: 1) or a pharmaceutical composition comprising the antibody, wherein the antibody contacts human CD137 at the following amino acid residues: 55, 59, 63, 66, 72, 93-103 (inclusive), and 112-116 (inclusive). The present disclosure provides an antibody that agonizes human CD137 (SEQ ID NO: 1) or a pharmaceutical composition comprising the antibody, wherein the antibody contacts human CD137 at the following amino acid residues: 55, 59, 63, 66, 72, 93-103 (inclusive), and 112-116 (inclusive); wherein contact is determined by X-ray crystallography and wherein the residues in contact are within six (6) angstroms or less of the antibody.

The present disclosure provides an antibody that agonizes human CD137 (SEQ ID NO: 1) or a pharmaceutical composition comprising the antibody, wherein the antibody contacts human CD137 at the following amino acid residues: 55, 59, 63, 66, 72, 93-103 (inclusive), and 112-116 (inclusive); wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody that agonizes human CD137 (SEQ ID NO: 1) or a pharmaceutical composition comprising the antibody, wherein the antibody contacts human CD137 at the following amino acid residues: 55, 59, 63, 66, 72, 93-103 (inclusive), and 112-116 (inclusive); wherein contact is determined by X-ray crystallography and wherein the residues in contact are within six (6) angstroms or less of the antibody; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides an antibody that agonizes human CD137 (SEQ ID NO: 1) for use in the treatment of cancer or for the manufacture of a medicament for the treatment of cancer, wherein the antibody contacts human CD137 at the following amino acid residues: 55, 59, 63, 66, 72, 93-103 (inclusive), and 112-116 (inclusive). The present disclosure provides an antibody that agonizes human CD137 (SEQ ID NO: 1) for use in the treatment of cancer or for the manufacture of a medicament for the treatment of cancer, wherein the antibody contacts human CD137 at the following amino acid residues: 55, 59, 63, 66, 72, 93-103 (inclusive), and 112-116 (inclusive); wherein contact is determined by X-ray crystallography and wherein the residues in contact are within six (6) angstroms or less of the antibody.

The present disclosure provides an antibody that agonizes human CD137 (SEQ ID NO: 1) for use in the treatment of cancer or the use of an antibody that agonizes human CD137 (SEQ ID NO: 1) for the manufacture of a medicament for the treatment of cancer, wherein the antibody contacts human CD137 at the following amino acid residues: 55, 59, 63, 66, 72, 93-103 (inclusive), and 112-116 (inclusive); wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody that agonizes human CD137 (SEQ ID NO: 1) for use in the treatment of cancer or the use of an antibody that agonizes human CD137 (SEQ ID NO: 1) for the manufacture of a medicament for the treatment of cancer, wherein the antibody contacts human CD137 at the following amino acid residues: 55, 59, 63, 66, 72, 93-103 (inclusive), and 112-116 (inclusive); wherein contact is determined by X-ray crystallography and wherein the residues in contact are within six (6) angstroms or less of the antibody; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides an antibody that agonizes human CD137 (SEQ ID NO: 1) or a pharmaceutical composition comprising the antibody, wherein the antibody does not bind human FcγRI, human FcγRIIa, human FcγRIIb, human FcγRIIIa(F), human FcγRIIIa(V), or human C1q. The present disclosure provides an antibody that agonizes human CD137 (SEQ ID NO: 1) for use in the treatment of cancer or for the manufacture of a medicament for the treatment of cancer, wherein the antibody does not bind human FcγRI, human FcγRIIa, human FcγRIIb, human FcγRIIIa(F), human FcγRIIIa(V), or human C1q.

The present disclosure provides an antibody that agonizes human CD137 (SEQ ID NO: 1) or a pharmaceutical composition comprising the antibody, wherein the antibody does not bind human FcγRI, human FcγRIIa, human FcγRIIb, human FcγRIIIa(F), human FcγRIIIa(V), or human C1q; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer. The present disclosure provides an antibody that agonizes human CD137 (SEQ ID NO: 1) for use in the treatment of cancer or for the manufacture of a medicament for the treatment of cancer, wherein the antibody does not bind human FcγRI, human FcγRIIa, human FcγRIIb, human FcγRIIIa(F), human FcγRIIIa(V), or human C1q; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides an antibody that is an agonist of human CD137 (SEQ ID NO:1), wherein the antibody comprises a heavy chain and a light chain; wherein the heavy chain contacts at least one amino acid residue of the following on human CD137: 55, 59, 63, 66, 72, 93-103 (inclusive), and 112-116 (inclusive); wherein the light chain contacts at least one amino acid residue of the following on human CD137: 96-98 (inclusive), 100, and 114-116 (inclusive).

The present disclosure provides an antibody that is an agonist of human CD137 (SEQ ID NO:1), wherein the antibody comprises a heavy chain and a light chain; wherein the heavy chain contacts at least one amino acid residue of the following on human CD137: 55, 59, 63, 66, 72, 93-103 (inclusive), and 112-116 (inclusive); wherein the light chain contacts at least one amino acid residue of the following on human CD137: 96-98 (inclusive), 100, and 114-116 (inclusive); wherein the residues in contact are within six (6) angstroms or less of the antibody, as determined by X-ray crystallography.

The present disclosure provides an antibody that is an agonist of human CD137 (SEQ ID NO:1), wherein the antibody comprises a heavy chain and a light chain; wherein the heavy chain contacts the following amino acid residues on human CD137: 55, 59, 63, 66, 72, 93-103 (inclusive), and 112-116 (inclusive); wherein the light chain contacts the following amino acid residues on human CD137: 96-98 (inclusive), 100, and 114-116 (inclusive).

The present disclosure provides an antibody that is an agonist of human CD137 (SEQ ID NO:1), wherein the antibody comprises a heavy chain and a light chain; wherein the heavy chain contacts the following amino acid residues on human CD137: 55, 59, 63, 66, 72, 93-103 (inclusive), and 112-116 (inclusive); wherein the light chain contacts the following amino acid residues on human CD137: 96-98 (inclusive), 100, and 114-116 (inclusive); wherein the residues in contact are within six (6) angstroms or less of the antibody, as determined by X-ray crystallography.

The present disclosure provides an antibody that is an agonist of human CD137 (SEQ ID NO:1), wherein the antibody comprises a heavy chain and a light chain; wherein the heavy chain contacts the following amino acid residues on human CD137: 55, 59, 63, 66, 72, 93-103 (inclusive), and 112-116 (inclusive); optionally, wherein the light chain contacts the following amino acid residues on human CD137: 96-98 (inclusive), 100, and 114-116 (inclusive).

The present disclosure provides an antibody that is an agonist of human CD137 (SEQ ID NO:1), wherein the antibody comprises a heavy chain and a light chain; wherein the heavy chain contacts the following amino acid residues on human CD137: 55, 59, 63, 66, 72, 93-103 (inclusive), and 112-116 (inclusive); optionally, wherein the light chain contacts the following amino acid residues on human CD137: 96-98 (inclusive), 100, and 114-116 (inclusive); wherein the residues in contact are within six (6) angstroms or less of the antibody, as determined by X-ray crystallography.

The present disclosure provides an antibody that is an agonist of human CD137 (SEQ ID NO:1) for use in the treatment of cancer, wherein the antibody comprises a heavy chain and a light chain; wherein the heavy chain contacts the following amino acid residues on human CD137: 55, 59, 63, 66, 72, 93-103 (inclusive), and 112-116 (inclusive); optionally, wherein the light chain contacts the following amino acid residues on human CD137: 96-98 (inclusive), 100, and 114-116 (inclusive); wherein the residues in contact are within six (6) angstroms or less of the antibody, as determined by X-ray crystallography.

The present disclosure provides the use of an antibody that is an agonist of human CD137 (SEQ ID NO:1) for the manufacture of a medicament for the treatment of cancer, wherein the antibody comprises a heavy chain and a light chain; wherein the heavy chain contacts the following amino acid residues on human CD137: 55, 59, 63, 66, 72, 93-103 (inclusive), and 112-116 (inclusive); optionally, wherein the light chain contacts the following amino acid residues on human CD137: 96-98 (inclusive), 100, and 114-116 (inclusive); wherein the residues in contact are within six (6) angstroms or less of the antibody, as determined by X-ray crystallography.

The present disclosure provides an antibody that is an agonist of human CD137 (SEQ ID NO:1) for use in the treatment of cancer, wherein the antibody comprises a heavy chain and a light chain; wherein the heavy chain contacts the following amino acid residues on human CD137: 55, 59, 63, 66, 72, 93-103 (inclusive), and 112-116 (inclusive); optionally, wherein the light chain contacts the following amino acid residues on human CD137: 96-98 (inclusive), 100, and 114-116 (inclusive); wherein the residues in contact are within six (6) angstroms or less of the antibody, as determined by X-ray crystallography; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides the use of an antibody that is an agonist of human CD137 (SEQ ID NO:1) for manufacture of a medicament for the treatment of cancer, wherein the antibody comprises a heavy chain and a light chain; wherein the heavy chain contacts the following amino acid residues on human CD137: 55, 59, 63, 66, 72, 93-103 (inclusive), and 112-116 (inclusive); optionally, wherein the light chain contacts the following amino acid residues on human CD137: 96-98 (inclusive), 100, and 114-116 (inclusive); wherein the residues in contact are within six (6) angstroms or less of the antibody, as determined by X-ray crystallography; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides an antibody that is an agonist of human CD137 (SEQ ID NO:1), wherein the antibody binds at least one of the following amino acid residues on human CD137: 97 and 115.

The present disclosure provides an antibody that is an agonist of human CD137 (SEQ ID NO:1), wherein the antibody binds at least two of the amino acid residues on human CD137: 97, 114, and 115.

The present disclosure provides an antibody that is an agonist of human CD137 (SEQ ID NO:1), wherein the antibody binds to the following amino acid residues on human CD137: 97, 114, and 115.

The present disclosure provides an antibody that is an agonist of human CD137 (SEQ ID NO:1), wherein the antibody binds at least one of the following amino acid residues on human CD137: 97 and 115; wherein binding is determined using a mutant human CD137 protein having a mutation at one or more of the following amino acid residues: 97, 114, and 115.

The present disclosure provides an antibody that is an agonist of human CD137 (SEQ ID NO:1), wherein the antibody binds at least two of the following amino acid residues on human CD137: 97, 114, and 115; wherein binding is determined using a mutant human CD137 protein having a mutation at one or more of the following amino acid residues: 97, 114, and 115.

The present disclosure provides an antibody that is an agonist of human CD137 (SEQ ID NO:1) for use in the treatment of cancer, wherein the antibody binds to the following amino acid residues on human CD137: 97, 114, and 115; wherein binding is determined using a mutant human CD137 protein having a mutation at one or more of the following amino acid residues: 97, 114, and 115.

The present disclosure provides the use of an antibody that is an agonist of human CD137 (SEQ ID NO:1) for the manufacture of a medicament for the treatment of cancer, wherein the antibody binds to the following amino acid residues on human CD137: 97, 114, and 115; wherein binding is determined using a mutant human CD137 protein having a mutation at one or more of the following amino acid residues: 97, 114, and 115.

The present disclosure provides an antibody that is an agonist of human CD137 (SEQ ID NO:1) for use in the treatment of cancer, wherein the antibody binds to the following amino acid residues on human CD137: 97, 114, and 115; wherein binding is determined using a mutant human CD137 protein having a mutation at one or more of the following amino acid residues: 97, 114, and 115; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides the use of an antibody that is an agonist of human CD137 (SEQ ID NO:1) for the manufacture of a medicament for the treatment of cancer, wherein the antibody binds to the following amino acid residues on human CD137: 97, 114, and 115; wherein binding is determined using a mutant human CD137 protein having a mutation at one or more of the following amino acid residues: 97, 114, and 115; wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

The present disclosure provides a fully human CD137 agonist antibody comprising two or more of the following features: (a) the antibody competes with human CD137-Ligand for binding to human CD137; (b) the antibody does not bind human FcγRI, human FcγRIIa, human FcγRIIb, human FcγRIIIa(F), human FcγRIIIa(V), or human C1q; (c) the antibody binds to cynomolgus monkey CD137; (d) the antibody inhibits human non-small cell lung tumor growth as a monotherapy; and (e) the antibody increases the frequency of intratumoral CD3$^+$ T cells.

Non-limiting examples of useful chemotherapeutic agents include 5-fluorouracil, hydroxyurea, gemcitabine, methotrexate, doxorubicin, etoposide, carboplatin, cisplatin, cyclophosphamide, melphalan, dacarbazine, taxol, camptothecin, FOLFIRI, FOLFOX, docetaxel, daunorubicin, paclitaxel, oxaliplatin, and combinations thereof.

The term "antibody" as used herein refers to a polypeptide complex having two heavy chains (HC) and two light chains (LC) such that the heavy chains and lights chains are interconnected by disulfide bonds; wherein the antibody is an IgG subclass antibody.

An antibody of the present invention is an engineered, non-naturally occurring polypeptide complex. A DNA molecule of the present invention is a DNA molecule that comprises a non-naturally occurring polynucleotide sequence encoding a polypeptide having the amino acid sequence of at least one of the polypeptides in an antibody of the present invention.

The antibody of the present invention is an IgG type antibody and has "heavy" chains and "light" chains that are cross-linked via intra- and inter-chain disulfide bonds. Each heavy chain is comprised of an N-terminal HCVR and a heavy chain constant region ("HCCR"). Each light chain is comprised of a LCVR and a light chain constant region ("LCCR"). When expressed in certain biological systems, antibodies having native human Fc sequences are glycosylated in the Fc region. Typically, glycosylation occurs in the Fc region of the antibody at a highly conserved N-glycosylation site. N-glycans typically attach to asparagine. Antibodies may be glycosylated at other positions as well.

Optionally, the anti-human CD137 antibodies described herein contain an Fc portion that is derived from human IgG1. IgG1 is well known to bind to the proteins of the Fc-gamma receptor family (FcγR) as well as C1q. Interaction with these receptors can induce antibody-dependent cell cytotoxicity (ADCC) and complement-dependent cytotoxicity (CDC). Therefore, optionally, the anti-human CD137 antibodies described herein are a fully human monoclonal antibody lacking Fc effector function (IgG1, Fc-null). To achieve an Fc-null IgG1 antibody, selective mutagenesis of residues is necessary within the CH2 region of its IgG1 Fc region. Amino acid substitutions L234A, L235E, and G237A are introduced into IgG1 Fc to reduce binding to FcγRI, FcγRIIa, and FcγRIII, and substitutions A330S and P331S are introduced to reduce C1q-mediated complement fixation. To reduce the potential induction of an immune response when dosed in humans, certain amino acids may require back-mutations to match antibody germline sequences.

The HCVR and LCVR regions can be further subdivided into regions of hyper-variability, termed complementarity determining regions ("CDRs"), interspersed with regions that are more conserved, termed framework regions ("FR"). Each HCVR and LCVR is composed of three CDRs and four FRs, arranged from amino-terminus to carboxy-terminus in the following order: FR1, CDR1, FR2, CDR2, FR3, CDR3, FR4. Herein, the three CDRs of the heavy chain are referred to as "HCDR1, HCDR2, and HCDR3" and the three CDRs of the light chain are referred to as "LCDR1, LCDR2 and LCDR3". The CDRs contain most of the residues which form specific interactions with the antigen. For the purposes of the present invention, the North CDR definitions are used. The North CDR definition (North et al., "A New Clustering of Antibody CDR Loop Conformations", Journal of Molecular Biology, 406, 228-256 (2011)) is based on affinity propagation clustering with a large number of crystal structures.

An isolated DNA encoding a HCVR region can be converted to a full-length heavy chain gene by operably linking the HCVR-encoding DNA to another DNA molecule encoding heavy chain constant regions. The sequences of human, as well as other mammalian, heavy chain constant region genes are known in the art. DNA fragments encompassing these regions can be obtained e.g., by standard PCR amplification.

An isolated DNA encoding a LCVR region may be converted to a full-length light chain gene by operably linking the LCVR-encoding DNA to another DNA molecule encoding a light chain constant region. The sequences of human, as well as other mammalian, light chain constant region genes are known in the art. DNA fragments encompassing these regions can be obtained by standard PCR amplification. The light chain constant region can be a kappa or lambda constant region. Preferably for antibodies of the present invention, the light chain constant region is a kappa constant region.

The polynucleotides of the present invention will be expressed in a host cell after the sequences have been operably linked to an expression control sequence. The expression vectors are typically replicable in the host organisms either as episomes or as an integral part of the host chromosomal DNA. Commonly, expression vectors will contain selection markers, e.g., tetracycline, neomycin, and dihydrofolate reductase, to permit detection of those cells transformed with the desired DNA sequences.

The antibody of the present invention may readily be produced in mammalian cells, non-limiting examples of which includes CHO, NS0, HEK293 or COS cells. The host cells are cultured using techniques well known in the art.

The vectors containing the polynucleotide sequences of interest (e.g., the polynucleotides encoding the polypeptides of the antibody and expression control sequences) can be transferred into the host cell by well-known methods, which vary depending on the type of cellular host.

Various methods of protein purification may be employed and such methods are known in the art and described, for example, in Deutscher, *Methods in Enzymology* 182: 83-89 (1990) and Scopes, *Protein Purification: Principles and Practice,* 3rd Edition, Springer, NY (1994).

In other embodiments of the present invention, the antibody, or the nucleic acids encoding the same, is provided in isolated form. As used herein, the term "isolated" refers to a protein, peptide, or nucleic acid which is free or substantially free from any other macromolecular species found in a cellular environment. "Substantially free" as used herein means the protein, peptide, or nucleic acid of interest comprises more than 80% (on a molar basis) of the macromolecular species present, preferably more than 90%, and more preferably more than 95%.

The antibody of the present invention, or pharmaceutical compositions comprising the same, may be administered by parenteral routes, a non-limiting example of which is intravenous administration. An antibody of the present invention may be administered to a patient alone with pharmaceutically acceptable carriers, diluents, or excipients in single or multiple doses. Pharmaceutical compositions of the present invention can be prepared by methods well known in the art (e.g., *Remington: The Science and Practice of Pharmacy,* $22^{nd}$ ed. (2012), A. Loyd et al., Pharmaceutical Press) and comprise an antibody, as disclosed herein, and one or more pharmaceutically acceptable carriers, diluents, or excipients.

Dosage regimens may be adjusted to provide the optimum desired response (e.g., a therapeutic effect). Treatment dosages may be titrated to optimize safety and efficacy. Dosing schedules, for intravenous (i.v.) or non-intravenous administration, localized or systemic, or combinations thereof, will typically range from a single bolus dosage or continuous infusion to multiple administrations per day (e.g., every 4-6 hours), or as indicated by the treating physician and the patient's condition. Dosing amounts and frequencies may be determined by the physicians treating the patient.

The term "treating" (or "treat" or "treatment") refers to slowing, interrupting, arresting, alleviating, stopping, reducing, or reversing the progression or severity of an existing symptom, disorder, condition, or disease.

"Effective amount" means the amount of an antibody of the present invention or pharmaceutical composition comprising an antibody of the present invention that will elicit the biological or medical response of or desired therapeutic effect on a tissue, system, animal, mammal or human that is being sought by the researcher, medical doctor, or other clinician. An effective amount of the antibody may vary according to factors such as the disease state, age, sex, and weight of the individual, and the ability of the antibody to elicit a desired response in the individual. An effective amount is also one in which any toxic or detrimental effect of the antibody is outweighed by the therapeutically beneficial effects.

Antibody Characterization, Generation, Expression, and Purification

Antibody production using the heavy chain polynucleotide sequence shown in SEQ ID NO: 14, and the light chain polynucleotide sequence shown in SEQ ID NO: 17 in mammalian cells results in the production of two antibody product-related species: (a) a full length antibody (hereafter referred to as "Antibody A1") having the heavy chain amino acid sequence shown in SEQ ID NO: 10 and the light chain amino acid sequence of SEQ ID NO: 11; and (b) a single amino acid truncated form of the antibody (hereafter referred to as "Antibody A2") resulting from the clipping of the n-terminal alanine of the light chain, the Antibody A2 having the heavy chain amino acid sequence shown in SEQ ID NO: 10 and the light chain amino acid sequence shown in SEQ ID NO: 13. As used herein, "Antibody A1/2" refers to the antibody product that results from the use of the light chain polynucleotide sequence shown in SEQ ID NO: 17 and includes a combination of Antibody A1 (~6%) and Antibody A2 (~94%). Antibody A1 can be synthesized without significant quantities of Antibody A2 using the heavy chain polynucleotide sequence shown in SEQ ID NO: 14 and the light chain polynucleotide sequence shown in SEQ ID NO: 15. Antibody A2 can be synthesized without significant quantities of Antibody A1 using the heavy chain polynucleotide sequence shown in SEQ ID NO: 14 and the light chain polynucleotide sequence shown in SEQ ID NO: 16.

The antibodies of the present invention may be generated by using known methods, including but not limited to, phage display. Additionally, the antibodies derived as described above may be further screened using the assays described herein.

The polypeptides of the variable regions of the heavy chain and light chain and the complete heavy chain and light chain amino acid sequences of Antibodies A1 and A2, and the nucleotide sequences encoding the same, are listed in the section entitled "Amino Acid and Nucleotide Sequences." In addition, the SEQ ID NOs for the light chain, heavy chain, light chain variable region, and heavy chain variable region of Antibodies A1, A2, and A1/2 are shown in Tables 1 & 2.

TABLE 1

| Corresponding SEQ ID (Amino Acid) | Antibody A1 | Antibody A2 |
|---|---|---|
| HCDR1 | 2 | 2 |
| HCDR2 | 3 | 3 |
| HCDR3 | 4 | 4 |
| LCDR1 | 5 | 5 |
| LCDR2 | 6 | 6 |
| LCDR3 | 7 | 7 |
| HCVR | 8 | 8 |
| LCVR | 9 | 12 |
| Heavy chain | 10 | 10 |
| Light chain | 11 | 13 |

TABLE 2

| Corresponding SEQ ID (DNA) | Antibody A1 | Antibody A2 | Antibody A1/2 |
|---|---|---|---|
| HC | 14 | 14 | 14 |
| LC | 15 | 16 | 17 |

The antibodies of the present invention, including, but not limited to, Antibodies A1, A2, and A1/2 can be made and purified essentially as follows. An appropriate host cell, such as HEK 293 or CHO, can be either transiently or stably transfected with an expression system for secreting antibodies using an optimal predetermined HC:LC vector ratio or a single vector system encoding both HC and LC. Clarified media, into which the antibody has been secreted, may be purified using any of many commonly-used techniques. For example, the medium may be conveniently applied to a MabSelect column (GE Healthcare), or KappaSelect column (GE Healthcare), that has been equilibrated with a compatible buffer, such as phosphate buffered saline (pH 7.4). The column may be washed to remove nonspecific binding components. The bound antibody may be eluted, for example, by pH gradient (such as 20 mM Tris buffer pH 7 to 10 mM sodium citrate buffer pH 3.0, or phosphate buffered saline pH 7.4 to 100 mM glycine buffer pH 3.0). Antibody fractions may be detected, such as by UV absorbance or SDS-PAGE, and then may be pooled. Further purification is optional, depending on the intended use. The antibody may be concentrated and/or sterile filtered using common techniques. Soluble aggregate and multimers may be effectively removed by common techniques, including size exclusion, hydrophobic interaction, ion exchange, multimodal, or hydroxyapatite chromatography. The product may be immediately frozen at −70° C. or may be lyophilized.

As used herein, BMS20H4.9 refers to an antibody having the heavy chain shown in SEQ ID NO: 18 and the light chain shown in SEQ ID NO: 19, and has been previously described in U.S. Pat. No. 7,288,638. As used herein, PF83 refers to an antibody having the heavy chain shown in SEQ ID NO: 20 and the light chain shown in SEQ ID NO: 21, and has been previously described in U.S. Pat. No. 8,337,850.

Antibody A1/2 Binds to Human CD137

The ability of the antibodies disclosed herein to bind human CD137 can be measured by ELISA. To measure binding to human CD137, a 96-well plate (Nunc) is coated with human CD137-Fc (R&D Systems) overnight at 4° C. Wells are blocked for 2 h with blocking buffer (PBS containing 0.2% bovine serum albumin and 0.05% Tween-20). Wells are washed three times with PBS containing 0.05% Tween-20. Antibody A1/2 or control IgG (100 microliters) is then added at different concentrations and incubated at room temperature for 1 h. After washing, the plate is incubated with 100 microliters of goat anti-human IgG F(ab')2-HRP conjugate (Jackson Immuno Research Laboratories) at room temperature for 45 minutes. The plates are washed and then incubated with 100 microliters of 3,3',5,5'-tetra-methylbenzidine. The absorbance at 650 nm is read on a SpectraMax® microplate reader. The half maximal effective concentration ($EC_{50}$) is calculated using GraphPad Prism 7 software.

In experiments performed essentially as described above, Antibody A1/2 binds human CD137 with an $EC_{50}$ of 0.027 nM.

Antibody A1/2 Binds to Cynomolgus Monkey CD137

The ability of the antibodies disclosed herein to bind to cell surface cynomolgus monkey CD137 can be measured using a flow cytometric assay. Cynomolgus monkey CD137 expressing stable cells are generated by transfecting Cyno-CD137 receptor plasmid DNA into human 293 cells (ATCC) using Lipofectamine™ 2000 reagent (Invitrogen™) per manufacturer's protocol. Stable cells are selected using 0.5 micrograms/mL puromycin in Dulbecoo's Modified Eagle's Medium containing 10% fetal bovine serum and 1% GlutaMAX™. For flow cytometry, confluent adherent cells are detached using Gibco® Cell Dissociation Buffer (Life Technologies), blocked in FACS buffer (phosphate buffered saline containing 3% fetal bovine serum) for 1 h at 4° C., and then transferred into a 96-well round-bottom plate at a density of 1×10⁵ cells/well. Antibody A1/2, BMS20H4.9, PF83, or control human IgG1 (diluted in FACS buffer 1:4 starting at 0.5 micrograms/mL) are added (100 microliters) and cells are stained for 1 h at 4° C.

After washing in FACS buffer, secondary antibody R-phycoerythrin conjugated goat anti-human IgG, F(ab')$_2$ fragment specific antibody (Jackson ImmunoResearch Laboratories) is added at a 1:200 dilution and cells are incubated at 4° C. for 30 minutes. Cells are washed and live/dead cell staining is performed using LIVE/DEAD® Fixable Far Red Dead Cell Stain kit (Life Technologies) per manufacturer's protocol. Cells are washed in FACS buffer and processed on an IntelliCyt HTFC® Screening System. Flow cytometry data is analyzed using FlowJo® Software. Mean fluorescence intensity (MFI) ratio is calculated as the (MFI of Experimental antibody)/(MFI of the control IgG).

In experiments performed essentially as described above, Antibody A1/2 at a concentration of 0.5 micrograms/mL displays a higher MFI ratio of 153 as compared to BMS20H4.9 (MFI ratio of 0.94) and PF83 (MFI ratio of 37).

Antibody A1/2 Binding on Human Cells Increases CD137 Expression

The ability of the antibodies disclosed herein to modulate human CD137 cell surface levels can be determined as follows. Human CD137 expressing stable cells are generated by transfecting human CD137 plasmid DNA into human 293 cells (ATCC) using Lipofectamine™ 2000 reagent (Invitrogen™) per manufacturer's protocol. Stable cells are selected using 0.5 micrograms/mL of puromycin in Dulbecoo's Modified Eagle's Medium containing 10% fetal bovine serum and 1% GlutaMAX™. CD137 antibodies starting at 300 nanomolar in media are incubated with the cells at 37° C. for 24 hr. The cells are washed with PBS, detached using Gibco® Cell Dissociation Buffer, and stained with the same CD137 antibodies in cold buffer (1x PBS, 1% BSA, 0.09% sodium azide) for 2 h. After washing, cells are stained with Alexa Fluor 647-conjugated goat anti-human IgG detection antibody (Jackson ImmunoResearch Laboratories) for 30 minutes. Cells are washed and differentially labeled with Zombie Green Live/Dead (BioLegend) per manufacturer's protocol. All cells are processed on a Fortessa X-20. Analysis is performed with FlowJo® Software to generate Median Fluorescence Intensity (MFI) of Alexa Fluor 647 and calibrated to an Alexa Fluor 647 molecules of equivalent soluble fluorochrome (MESF) standard curve (Bangs Laboratories). MESF values are normalized to untreated stained controls (100%) and untreated isotype stained controls (0%).

In experiments performed essentially as described above, Antibody A1/2 at a concentration of 300 nanomolar induces an increase (21%) in CD137 levels compared to PF83 (12%) whereas BMS20H4.9 reduces CD137 on the cell surface by 56%.

NF-kappaB Luciferase Reporter Assay Activity of Antibody A1/2

The ability of the antibodies disclosed herein to activate NF-kappaB can be measured as follows. Double stable NF-kappaB luciferase reporter/human CD137-293 cells are generated by transfecting pGL4.32[luc2P/NF-kappaB-RE/Hygro] plasmid DNA (Promega) into human CD137-expressing 293 cells using Lipofectamine™ 2000 Reagent (Life Technologies) per manufacturer's protocol. Stable cells are selected using 100 micrograms/mL hygromycin and 0.5 micrograms/mL puromycin in Dulbecoo's Modified Eagle's Medium containing 10% fetal bovine serum and 1% GlutaMAX™. Cells are plated in a 384 well plate at a density of 5×10³ cells/well using the Thermo MultiDrop Combi Reagent Dispenser (Thermo Fisher Scientific) and cultured overnight at 37° C. Antibody A1/2, BMS20H4.9, PF83, or control human IgG1 are diluted in phosphate buffered saline (PBS) using Hamilton STAR™ (Hamilton Company) at 10-point 2-fold dilutions within the plate starting at 9 micromolar or 1.33 micromolar and transferred to cells. Cells are then incubated with the antibodies for 5.5 h at 37° C. in 5% $CO_2$ and then processed using the ONE-Glo™ Luciferase Assay System (Promega™) and Thermo™ Scientifi MultiDrop™ Combi Reagent Dispenser. Luminescence is measured using a SpectraMax® microplate reader (Molecular Devices) and data analysis is performed using a Genedata Screener® (Genedata). Data is normalized as follows: % Activity=[(Well Value−Median of Minimum Control)/(Median of Maximum Control−Median of Minimum Control)]×100%.

In experiments performed essentially as described above, Antibody A1/2 displays a max activity of 78% that is higher than PF83 (max activity of 12%) and lower than BMS20H4.9 (max activity of 115%).

Antibody A1/2 Promotes T Cell-Derived Interferon-Gamma Production

The ability of the antibodies disclosed herein to promote T cell-derived interferon-gamma (IFN-gamma) production can be measured as follows. Human peripheral blood mononuclear cells (PBMCs) are isolated from whole blood or leukopacs by Ficoll density gradient centrifugation (Ficoll® Paque PLUS; GE Healthcare) and grown in Roswell Park Memorial Institute medium (RPMI) (Life Technologies) with 10% fetal calf serum (HyClone). Anti-human CD3 antibody clone HIT3a (BD Biosciences) in PBS is coated onto a 96-well plate (typical range: 2 to 15 nanograms/well) and incubated overnight at 4° C. After aspirating, wells are rinsed with PBS and human PBMCs are transferred onto a 96-well plate at a density of 1.5×10⁵ cells/well. Antibody A1/2, BMS20H4.9, PF83, or control human IgG1 are prepared by diluting 1:4 in RPMI containing 10% fetal bovine serum at a starting concentration of 80 micrograms/mL. Anti-human CD28 antibody clone CD28.2 (BioLegend) is added to the plate (typical range 0.2 to 2 micrograms/mL) followed by the test antibody and incubated for 96 h at 37° C. in a humidified 5% $CO_2$ incubator. Supernatants are collected and human IFN-gamma levels are measured using a R&D Systems® human IFN-gamma DuoSet ELISA Kit. Briefly, IFN-gamma capture antibody is coated onto plate (4 micrograms/mL) overnight at room temperature. After aspirating and washing, the plate is blocked for 1 h at room temperature. Sample supernatants and IFN-gamma standard are added and incubated for 2 h at room temperature. After washing, 100 microliters of IFN-gamma detection antibody is added, incubated for 2 hr at room temperature, and washed. Streptavidin-HRP (100 microliters of 1:40 dilution) is added for 20 minutes at room temperature. After washing, plates are developed by adding 100 microliters substrate solution for 20 minutes followed by 50 microliters stop solution, and the signal is measured at 450 nm with SpectraMax® microplate reader. Data analysis is performed using SoftMax Pro software and GraphPad Prism (GraphPad Software). Fold induction is calculated as sample mean IFN-gamma (pg/mL)/Control hIgG1 mean IFN-gamma (pg/mL).

In experiments performed essentially as described above, Antibody A1/2 enhances the sub-optimal activation of human PBMCs by CD3/CD28 co-stimulation as measured by IFN-gamma cytokine production. In this regard, treatment with Antibody A1/2 at 5 micrograms/ml results in a 3.8-fold increase in the production of IFN-gamma that was higher than PF83 (1.6-fold increase) and lower than BMS20H4.9 (9.4-fold increase).

Antibody A1/2 Solid-Phase Binding Assay

The binding of Antibody A1/2 to human C1q can be measured using an ELISA assay. Antibody A1/2 and control antibodies (negative control IgG1) are serially diluted in PBS and coated onto an ELISA plate overnight at 4° C. Human C1q in casein buffer is added at a concentration of 10 milligrams/mL and incubated for 2 hrs. Human C1q is detected by incubating the plates with anti-human C1q-HRP (AbD Serotec Inc., 1:200 dilution) for 1 h and the plate is developed using TMB (KPL, Inc.). Absorbance is measured at 450 nm with Synergy Neo2 hybrid multi-mode reader (BioTek®).

The binding of Antibody A1/2 to FcγRI, FcγRIIa(H), FcγRIIb, FcγRIIIa(F), and FcγRIIIa(V) is determined using an MSD assay (Meso Scale Diagnostics). Briefly, Fcγ receptors are coated onto a Meso Scale plate overnight and serially diluted test antibodies are added to the plate and incubated for 2 h. Antibody A1/2 is detected using an anti-human secondary antibody (Meso Scale Diagnostics, D20TF-6) and the plate is developed with Read Buffer T (Meso Scale Diagnostics, R92TC-1). Luminescence is measured on a SECTOR Imager 2400 (Meso Scale Diagnostics) and data is analyzed using GraphPad Prism 7.0 software.

TABLE 3

| Antibody | FcγRI (EC$_{50}$ nM) | FcγRIIa(H) (EC$_{50}$ nM) | FcγRIIb (EC$_{50}$ nM) | FcγRIIIa(F) (EC$_{50}$ nM) | FcγRIIIa(V) (EC$_{50}$ nM) | Human C1q (EC$_{50}$ nM) |
|---|---|---|---|---|---|---|
| Antibody A1/2 | >5* | >134* | >134* | >134* | >134* | >330* |
| Positive Control IgG1 (Intact Fc receptor effector functionality) | 0.8 | 93.7 | >134* | 19 | 6.2 | 8.9 |

*Denotes the maximum concentration of the antibody tested

In experiments performed essentially as described above, Antibody A1/2 did not bind to FcγRI, FcγRIIa, FcγRIIb, FcγRIIIa, FcγRIIIa, or C1q (as shown in Table 3 above). In other experiments, Antibody A1/2 exhibited no detectable effector function in cell-based antibody-dependent cellular cytotoxicity and complement-dependent cytotoxicity assays.

Antitumor Efficacy of Antibody A1/2 in an Established Tumor Model

The HCC827 human non-small cell lung cancer (ATCC) tumor cell line is maintained in its respective media and harvested for implantation. Tumor cells (1×10$^7$ cells per mouse) are injected subcutaneously into the right flank of female NOD/SCID Gamma (NSG) mice at 7 weeks of age (Jackson Laboratories). When tumors reach approximately 350 mm$^3$ to 450 mm$^3$ in size, mice are randomized into groups of 5 to 8. Human expanded T cells are generated by stimulating naïve human PBMCs with Dynabeads® Human T-expander CD3/CD28 beads (Thermo Fisher Scientific) for 9 to 10 days and banked. Human PBMCs (NY Blood Center) are prepared by centrifugation over Ficoll® Paque PLUS in SepMate tubes (STEMCELL Technologies) and banked. Expanded T cells are thawed and 1×10$^6$ cells are injected into the mice. As a control, tumor cells alone are implanted with no T cells or PBMCs in some mice. Treatment starts at either Day 0 or Day 1. Treatment groups include control IgG, BMS20H4.9, PF83, and Antibody A1/2. Animals are dosed via intraperitoneal injection at 10 mg/kg of antibody once weekly for 4 weeks. Body weight (BW) is recorded twice a week and the percent change in BW is calculated using the formula: (BW on observation day−BW on initial day)/BW initial day×100%. Tumor volumes are measured twice per week using electronic calipers. Tumor volume is calculated using the formula: Tumor Volume (mm$^3$)=π/6*Length*Width$^2$. The % T/C is calculated using the formula 100× ΔT/ΔC if ΔT>0 of the geometric mean values. ΔT=mean tumor volume of the drug-treated group on the observation day of the study−mean tumor volume of the drug-treated group on initial day of dosing; ΔC=mean tumor volume of the control group on the observation day of the study−mean tumor volume of the control group on initial day of dosing. Statistical analysis of tumor volume data is performed by two-way repeated measures analysis of variance by time and treatment using the MIXED procedures in SAS software (Version 9.2).

In experiments performed essentially as described above, mice treated with Antibody A1/2 demonstrated significant tumor growth inhibition (T/C %=30.6; P<0.001) in contrast to mice treated with PF83 (T/C %=81.2) and BMS20H4.9 (T/C %=96.9) which showed no inhibition.

Kinetics/Affinity Results for Antibody A1, Antibody A2, and Antibody A1/2

A Biacore T200 instrument can be used to measure the kinetics of immobilized human CD137-Fc binding to Antibody A1, Antibody A2, and Antibody A1/2. Recombinant human extracellular CD137-Fc protein (R&D Systems) is covalently immobilized to a CM5 sensor chip via amine coupling (GE Healthcare). CD137 antibody testing is performed at a flow rate of 30 microliters/min in HBS-EP+ buffer. Samples are injected at various concentrations and measurements obtained at 25° C. The surface is regenerated after each sample injection with 10 millimolar Glycine-HCl pH2.0 at flow rate of 30 microliters/min for 24 seconds and then stabilized with buffer for 10 seconds. Sensorgrams of concentrations ranging from 0.123 nanomolar to 30 nanomolar are evaluated using Biacore T200 software. Calculation of association (Ka) and dissociation (Kd) rate constants are based on a 1:1 Langmuir binding model fit. The equilibrium dissociation constant (KD) or binding affinity constant is calculated from the ratio of kinetic rate constants Kd/Ka.

In experiments performed essentially as described above, Antibody A1, Antibody A2, and Antibody A1/2 bind to human CD137 with the kinetics and affinity constants illustrated in Table 4.

TABLE 4

| Antibody | $K_{on}$ (1/Ms) | $K_{off}$ (1/s) | $K_D$ (M) | $R_{max}$ | Chi$^2$ |
|---|---|---|---|---|---|
| Antibody A2 | 1.33E+06 | 7.13E−03 | 5.36E−09 | 23.10 | 0.247 |

TABLE 4-continued

| Antibody | $K_{on}$ (1/Ms) | $K_{off}$ (1/s) | $K_D$ (M) | $R_{max}$ | Chi$^2$ |
|---|---|---|---|---|---|
| Antibody A1 | 1.61E+06 | 5.36E−03 | 3.33E−09 | 22.76 | 0.355 |
| Antibody A1/2 | 1.52E+06 | 7.11E−03 | 4.67E−09 | 20.86 | 0.303 |

NF-kappaB Luciferase Reporter Assay Comparing Antibody A1, Antibody A2, and Antibody A1/2

The ability of the antibodies disclosed herein to activate NF-kappaB can be measured as previously described herein with the modification that the antibody dilutions are prepared in PBS and 10-point 2-fold dilutions are made within the plate starting at 9 micromolar.

In experiments performed essentially as described above, Antibody A1/2 (max activity of 70.5%) displayed a similar max activity as compared to Antibody A1 (max activity of 63.4%) and Antibody A2 (max activity of 72.3%).

Antibody A1 and Antibody A2 Promote T Cell-Derived Interferon-Gamma Production

The ability of antibodies disclosed herein to promote T cell-derived interferon-gamma (IFN-gamma) production can be measured as previously described herein. In experiments performed essentially as described herein, Antibody A1, Antibody A2, and Antibody A1/2 enhance the suboptimal activation of human PBMCs by CD3/CD28 co-stimulation as measured by IFN-gamma cytokine production. In this regard, treatment with Antibody A1/2 at 5 micrograms/mL results in a 3.1-fold increase in the production of IFN-gamma that was comparable to Antibody A1 (3.5-fold increase) and Antibody A2 (3.5-fold increase).

Antitumor Efficacy of Antibody A1 and Antibody A2 in an Established Tumor Model

The ability of the antibodies disclosed herein to inhibit tumor growth in mice can be measured as previously described herein.

In experiments performed as essentially described above, Antibody A1, Antibody A2, and Antibody A1/2 inhibit tumor growth in the HCC827 established tumor model. Treatment with Antibody A1/2 (T/C %=47.1%; P<0.001) shows a similar reduction in tumor growth as Antibody A1 (T/C %=56.0%; P<0.001) and Antibody A2 (T/C %=48.7%; P<0.001).

Epitope of Antibody A1 as Determined Via X-Ray Crystallography

Antibody A1-Fab is purified from a 293HEK cell supernatant using a 12 mL CaptureSelect IgG-CH1 Affinity Matrix. SDS-PAGE and analytical size exclusion chromatography (SEC) are utilized to address the purity and quality of the purified Antibody A1-Fab. The eluted material of this matrix is buffer exchanged with 1×Tris-buffered saline (TBS). The hCD137* (*(human CD137 amino acids 22-161, ΔC121S)-AAA-6His) is purified from a 293HEK supernatant in three steps that utilize Ni Sepharose® Excel columns, Ni-NTA columns, and SEC columns. Briefly, two liters of supernatant is loaded directly without any buffer exchange into a Ni Sepharose Excel column. The elutant of this step is buffer exchanged with PBS and further purified using a Ni-NTA gravity flow column. The elutant of this step is further purified and buffer exchanged with 1×TBS using a preparatory SEC column. Flow through from the first Ni Sepharose Excel step contains significant amounts of hCD137*. It is then reloaded into a Ni Sepharose Excel column followed by the Ni-NTA and preparatory SEC columns. SDS-PAGE is used to pool the hCD137* fractions based on their purity. The concentration of hCD137* is 14.5 milligrams/mL and that of Antibody A1-Fab is 7.5 milligrams/mL.

The Antibody A1-Fab:CD137* complexes are combined at a 1:1 molar ratio and then subjected to a gel filtration column, pre-equilibrated in 20 millimolarTris pH 8.0, 100 millimolar sodium chloride. The resulting complex is concentrated to 12.5 milligrams/mL. After filtration, the Antibody A1-Fab:CD137 complex is set to a 1:1 ratio with sparse matrix crystal screening conditions in sitting drop plates using a Phoenix liquid handler, at both 21° C. and 8° C. Large, prism-like crystals grow in a single condition within 4 days in 1 molar Tri Sodium Citrate pH 6.5 at 21° C. Crystals are harvested and cryo-protected in 20% glycerol and reservoir conditions, mounted and flash-frozen in liquid nitrogen, then using an Advanced Photo Source, Argonne National Laboratory, samples are X-ray screened and the data is collected. The Antibody A1-Fab/hCD137* data is processed to 2.4 Å using the CCP4 suite of programs (Winn, M. D. et al. Acta. Cryst. 2011: D67, 235-242). The crystal belongs to Space Group P3$_1$21, with cell parameters a=b=124.9 Å, b=112.7 Å, α=β=90° and γ=120°. The structure is determined by Molecular Replacement with the program Phaser (McCoy, A. J. et al. J. Appl. Cryst. 2007 40: 658-674) using an internal Fab structure as a search model. The molecular replacement solution for the Fab is refined using Refmac (Winn, M. D. et al. Acta. Cryst. 2011: D67, 235-242; Murshudov, G. N. Act. Cryst. 2011: D67, 355-367) and Buster (Bricogne, G. et al. 2016; Buster Version 2.11.6. Cambridge, United Kingdom: Global Phasing Let.). Maps from the refinement are used to manually build in the model for CD137 using the program COOT (Emsley, P. Acta Cryst. 2010: D66, 486-501). The refined R-factors are R=17.8%, Rfree=20.5%.

In experiments performed essentially as described in this assay, Antibody A1-Fab:hCD137* complex is resolved and the epitope/paratope is illustrated in Table 5 below. Table 5 lists the residues on Antibody A1-Fab that are within 6A of the listed residues on hCD137*. The heavy chain of the Antibody A1-Fab has 57 contacts (cutoff 6 Å) with hCD137* while the light chain has 18 contacts (cutoff 6 Å).

TABLE 5

| Human CD137 (Epitope) | Antibody A1 Heavy Chain (Paratope) | Antibody A1 Light Chain (Paratope) |
|---|---|---|
| S55 | Q62 | — |
| Q59 | Q62 | — |
| D63 | Q62 | — |
| R66 | F55 | — |
| F72 | F55 | — |
| H93 | T103 | — |
| C94 | T102, T103, A104, P105 | — |
| L95 | M101, T102, T103, P105, G106, T107 | — |
| G96 | L100, M101, T102, T103, P105, G106, T107 | G92, N93 |
| A97 | M101, T102, P105, G106, T107 | G92, N93, S94, F95, L97 |
| G98 | P105 | G92, N93, S94, F95 |
| C99 | P105 | — |
| S100 | I52, F55, N59, M101, P105, T107 | F95 |
| M101 | S31, I52, I54, F55, M101 | — |

TABLE 5-continued

| Human CD137 (Epitope) | Antibody A1 Heavy Chain (Paratope) | Antibody A1 Light Chain (Paratope) |
|---|---|---|
| C102 | F55 | — |
| E103 | T103 | — |
| L112 | T103 | — |
| T113 | T103 | — |
| K114 | M101, T102, T103, A104 | D51, D54 |
| K115 | L100, M101, T102, T103, D110 | F50, E56, T57 |
| G116 | M101, T102, T103 | F50 |

Antibody A1/2 Completely Blocks CD137/CD137-Ligand Interactions

The ability of the antibodies disclosed herein to block human CD137 and CD137-Ligand (hereafter, CD137L) interactions can be measured with an ELISA assay. First, an ELISA assay is utilized to quantify the binding $EC_{50}$ of hCD137** (human CD137 amino acids 22-164, ΔC121S)-AAA-FLAG to hCD137L* and Antibody A1/2, BMS20H4.9 and PF83. The wells of a 96 well Immulon® 4HBX ELISA plate are coated overnight with 50 nanograms of hCD137** in 100 microliters of PBS, pH 7.2 with mild agitation at 4° C. After blocking with 5% BSA in PBST and washing, a five-fold dilution series (392 nanomlar–0.005 nanomolar) of His-tagged recombinant human CD137L (hereafter referred to as hCD137L*) (R&D Systems), (53-0.00068 nanomolar) of BMS20H4.9, (107-0.0014 nanomolar) of PF83, or (53-0.00068 nanomolar) of Antibody A1/2 are added with each dilution conducted in duplicate and incubated with mild agitation for 1 h at room temperature. The wells treated with the anti-CD137 antibodies are then washed and a 1:10000 dilution of HRP-conjugated goat anti-Fab antibody (Jackson ImmunoResearch Laboratories) is added and incubated at room temperature following standard protocol. The wells treated with hCD137L* are then washed and a 1:5000 dilution of HRP-conjugated mouse anti-His antibody (Sigma-Aldrich®) is added and the plates are incubated at room temperature following standard protocol. TMB peroxidase chromogenic substrate and stop solution are used according to manufacturer's instruction for visualization and detection of signals. Absorbance readings are plotted in GraphPad Prism Software Version 6. $EC_{50}$ values are calculated by nonlinear regression curve fit analysis of the software's One Site—Specific Binding function. In experiments performed as described, the binding affinities ($EC_{50}$) to hCD137** are determined as 0.6 nanomolar for hCD137L, 1.4 nanomolar for Antibody 1/2, 0.43 nanomolar for BMS20H4.9, and greater than 10 nanomolar for PF83.

The ability of hCD137L* to compete with BMS20H4.9, PF83, and Antibody A1/2 for binding to hCD137 can be determined as follows. A 96-well Immulon 4HBX ELISA plate is coated overnight with 50 nanograms of hCD137 in 100 microliters of PBS, pH 7.2 with mild agitation at 4° C. After blocking (with 5% BSA in PBST) and washing, a five-fold dilution (196 to 0.0025 nanomolar) of hCD137L* is mixed with saturating amounts of the designated antibody: Antibody A1/2 (200 nanograms/well), BMS20H4.9 (3 nanograms/well), or PF83 (1000 nanograms/well). The mixtures are then added to the wells in duplicates and incubated with mild agitation at room temperature for 1 h. After washing, the plate is incubated with HRP-conjugated goat anti-Fab antibody (1:1000 dilutions, Jackson ImmunoResearch Laboratories) at room temperature following standard protocol. TMB peroxidase chromogenic substrate and stop solution are used according to manufacturer's instruction for visualization and detection of signals.

The percentage of mAb that remains bound to CD137 is plotted and $IC_{50}$ values are calculated by nonlinear regression curve fit analysis using GraphPad Prism software. In experiments performed essentially as described above, hCD137L* fully blocks the binding of Antibody A1/2 to hCD137** with an $IC_{50}$ of 0.401 nanomolar. hCD137L* also blocks the binding of PF83 to hCD137** with an $IC_{50}$ of 1.037 nanomolar (30% binding signal remains on the surface). There is no measurable effect of hCD137L* on the binding of BMS20H4.9 to hCD137**.

Antibody A1/2 Binds Human CD137 at Specific Amino Acid Residues that are Distinct from BMS20H4.9 and PF83

Human CD137 point mutations are introduced to determine the amino acids residues where Antibody A1/2, BMS20H4.9, and PF83 bind to human CD137. The CD137-Fc mutants are generated using the standard protocol of a commercially-available site directed mutagenesis kit (Quickchange II kit, Qiagen). The wild-type and mutant CD137-Fc proteins are expressed and purified. All the mutants reported here have a size exclusion profile similar to that of the wild-type CD137-Fc (i.e. the mutations introduced do not compromise the structural integrity of the protein). To determine the impact of a mutation on the binding of the antibodies, a point ELISA assay against CD137-Fc wild type and mutants is utilized. The wells of a 96-well Immulon 4HBX ELISA plate are coated overnight with 50 nanograms of human CD137-ECD-C121S-Fc or its mutants in 100 microliters of PBS, pH 7.2 with mild agitation at 4° C. After blocking (with 5% BSA in PBST) and washing, a five-fold dilution eight-point series (100-0.00128 nanomolar) of the designated antibody is added and incubated with mild agitation at room temperature for 1 h. The wells are washed and a HRP-conjugated secondary antibody (1:10000 dilution of HRP-conjugated goat anti-Fab antibody (Jackson ImmunoResearch Laboratories) is added and incubated at room temperature following standard protocol. TMB peroxidase chromogenic substrate and stop solution are used according to manufacturer's instruction for visualization and detection of signals. Absorbance readings for each concentration point is normalized by the absorbance of the wild-type interaction. For each mutant, the mean of the normalized ratio for the eight concentrations is determined.

Mutations were individually introduced into human CD137 (SEQ TD NO: 1) at positions: P27, N42, D63, Q67, A97, G98, S100, M101, Q104, K114, K115, R130, I132, R134. Table 6 demonstrates the binding profiles of BMS2H4.9 and Antibody A/2 for the shown mutants of human CD137. Table 7 demonstrates the binding profiles of PF83 and Antibody A1/2 for the shown mutants of human CD137. Collectively, Tables 6 and 7 demonstrate that Antibody A1/2 binds to distinct amino acid residues on human CD137 as compared to BMS20H4.9 and PF-83.

TABLE 6

| | BMS20H4.9 (% of binding relative to wild-type hCD137) | Antibody A1/2 (% of binding relative to wild-type hCD137) |
|---|---|---|
| P27L* | 85 | 100 |
| N42S* | 0 | 100 |
| D63N | 100 | 100 |
| Q67R | 100 | 100 |
| Q67V | 100 | 100 |
| A97P | 100 | 15 |

TABLE 6-continued

|  | BMS20H4.9 (% of binding relative to wild-type hCD137) | Antibody A1/2 (% of binding relative to wild-type hCD137) |
|---|---|---|
| G98K | 100 | 85 |
| G98Q | 100 | 100 |
| S100T | 100 | 100 |
| M101R | 100 | 100 |
| Q104K | 100 | 100 |
| K114E | 100 | 20 |
| K115Q | 100 | 25 |

*Denotes positions that are outside the epitope of Antibody A1/2 as determined via X-Ray Crystallography at 6Å

TABLE 7

|  | Antibody A1/2 (% of binding relative to wild-type hCD137) | PF83 (% of binding relative to wild-type hCD137) |
|---|---|---|
| K115Q | 25 | 100 |
| R130A* | 100 | 100 |
| R130H* | 100 | 100 |
| I132V* | 100 | 100 |
| R134Q* | 100 | 25 |

*Denotes positions that are outside the epitope of Antibody A1/2 as determined via X-Ray Crystallography at 6Å

CD137 Gene Expression in Human Tumors

CD137 gene expression profile in human tumor immune infiltrates can be analyzed using The Cancer Genome Atlas (TCGA) database and computational methodologies. Briefly, expression ratios of CD137/CD3e are generated from Omicsoft curated TCGA RNASeq results. To compare the expression ratios of CD137/CD3e in tumor samples and adjacent normals of same tissue, a t-test is performed and Cohen's d is calculated for each tumor type. Tumor types that have a P value<0.05 in the t-test of expression ratio of tumor versus normal and a large effect size of Cohen's d>0.8 are statistically significant. The difference in expression ratio of CD137/CD3e in tumor versus normal tissue is calculated as the log fold change (log FC).

In experiments performed as described, an increased tumor CD137/CD3 ratio is observed across different cancer types, including, but not limited to, breast, colon, endometrial, bladder and head and neck (Table 8). Tumors enriched with CD137+ lymphocytes are candidates for CD137 antibody therapy using Antibody A1, Antibody A2 or Antibody A1/2.

TABLE 8

| Cancer | CD137/CD3 Expression Ratio (logFC) | P Value |
|---|---|---|
| Bladder | 1.92 | 3.85E-03 |
| Breast | 2.46 | 3.56E-39 |
| Cholangiocarcinoma | 1.78 | 4.81E-06 |
| Colon | 2.36 | 1.23E-19 |
| Endometrial | 2.14 | 4.01E-15 |
| Esophageal | 1.07 | 1.71E-04 |
| Gastric | 1.68 | 9.27E-10 |
| Head & Neck | 1.90 | 8.06E-15 |
| Lung Adenocarcinoma | 1.37 | 2.63E-13 |
| Lung Squamous Cell Carcinoma | 1.63 | 2.37E-13 |
| Prostate | 1.04 | 2.73E-04 |
| Rectal | 1.62 | 1.40E-05 |
| Thyroid | 1.24 | 2.29E-06 |

Antibody A1/2 Increases CD3+ T Cell Tumor Infiltration In Vivo

The ability of antibodies disclosed herein to alter T cell tumor infiltration in humanized mouse models can be determined by immunohistochemistry (IHC). Briefly, L55 human non-small cell lung cancer cells (L55-CBG-2A-GFP, University of Pennsylvania) are implanted in NSG mice. When tumors reach 250-300 $mm^3$-in size, human PBMCs ($8\times10^6$ cells) are injected and antibodies are dosed at 10 milligrams/kg once weekly for 4 weeks. At the end of the study, tumors are collected in formalin, processed into paraffin, sectioned, and stained with an anti-CD3 antibody (Cell Signaling Technology). Images are acquired at 200× magnification using an Aperio XT ScanScope® and semi-quantitatively analyzed. The percentage of CD3 positive cells to total tumor cells is calculated using Aperio ImageScope software. Results are compared by One Way ANOVA, followed by Holm-Sidak method for multiple comparisons (Sigma Plot 12.5, Systat Software).

In experiments performed as described above, Antibody A1/2 induces CD3+ T cell tumor infiltration in L55 established tumors. The percentage of CD3+ T cells in response to Antibody A1/2 (60%) is higher as compared to BMS20H4.9 (18%) or human IgG (27%) treatments.

```
Amino Acid and Nucleotide Sequences
(human CD137)
                                            SEQ ID NO: 1
MGNSCYNIVATLLLVLNFERTRSLQDPCSNCPAGTFCDNNRNQICSPCP

PNSFSSAGGQRTCDICRQCKGVFRTRKECSSTSNAECDCTPGFHCLGAG

CSMCEQDCKQGQELTKKGCKDCCFGTFNDQKRGICRPWTNCSLDGKSVL

VNGTKERDVVCGPSPADIFKQPFMRPVQTTQEEDGCSCRFPEEEEGGCE

L (HCDR1)
                                            SEQ ID NO: 2
KASGGTFSSYAIS (HCDR2)
                                            SEQ ID NO: 3
GIIPIFGTANYAQKFQG (HCDR3)
                                            SEQ ID NO: 4
ARDLMTTAPGTYFDL (LCDR1)
                                            SEQ ID NO: 5
QASQDIGNSLG (LCDR2)
                                            SEQ ID NO: 6
FDASDLET (LCDR3)
                                            SEQ ID NO: 7
QQGNSFPLT (HCVR)
                                            SEQ ID NO: 8
QVQLVQSGAEVKKPGSSVKVSCKASGGTFSSYAISWVRQAPGQGLEWMG

GIIPIFGTANYAQKFQGRVTITADESTSTAYMELSSLRSEDTAVYYCAR

DLMTTAPGTYFDLWGRGTLVTV (LCVR of Antibody A1)
                                            SEQ ID NO: 9
AIRMTQSPPSLSASVGDRVTITCQASQDIGNSLGWYQQKPGKAPKLVIF
```

DASDLETGVPSRFSGSGSGTDFSLTISSLQPEDFATYYCQQGNSFPLTF
GQGTRLEIK (HC)
SEQ ID NO: 10
QVQLVQSGAEVKKPGSSVKVSCKASGGTFSSYAISWVRQAPGQGLEWMG
GIIPIFGTANYAQKFQGRVTITADESTSTAYMELSSLRSEDTAVYYCAR
DLMTTAPGTYFDLWGRGTLVTVSSASTKGPSVFPLAPSSKSTSGGTAAL
GCLVKDYFPEPVTVSWNSGALTSGVHTFPAVLQSSGLYSLSSVVTVPSS
SLGTQTYICNVNHKPSNTKVDKRVEPKSCDKTHTCPPCPAPEAEGAPSV
FLFPPKPKDTLMISRTPEVTCVVVDVSHEDPEVKFNWYVDGVEVHNAKT
KPREEQYNSTYRVVSVLTVLHQDWLNGKEYKCKVSNKALPSSIEKTISK
AKGQPREPQVYTLPPSREEMTKNQVSLTCLVKGFYPSDIAVEWESNGQP
ENNYKTTPPVLDSDGSFFLYSKLTVDKSRWQQGNVFSCSVMHEALHNHY
TQKSLSLSPGK (LC of Antibody A1)
SEQ ID NO: 11
AIRMTQSPPSLSASVGDRVTITCQASQDIGNSLGWYQQKPGKAPKLVIF
DASDLETGVPSRFSGSGSGTDFSLTISSLQPEDFATYYCQQGNSFPLTF
GQGTRLEIKRTVAAPSVFIFPPSDEQLKSGTASVVCLLNNFYPREAKVQ
WKVDNALQSGNSQESVTEQDSKDSTYSLSSTLTLSKADYEKHKVYACEV
THQGLSSPVTKSFNRGEC (LCVR of Antibody A2)
SEQ ID NO: 12
IRMTQSPPSLSASVGDRVTITCQASQDIGNSLGWYQQKPGKAPKLVIFD
ASDLETGVPSRFSGSGSGTDFSLTISSLQPEDFATYYCQQGNSFPLTFG
QGTRLEIK (LC of Antibody A2)
SEQ ID NO: 13
IRMTQSPPSLSASVGDRVTITCQASQDIGNSLGWYQQKPGKAPKLVIFD
ASDLETGVPSRFSGSGSGTDFSLTISSLQPEDFATYYCQQGNSFPLTFG
QGTRLEIKRTVAAPSVFIFPPSDEQLKSGTASVVCLLNNFYPREAKVQW
KVDNALQSGNSQESVTEQDSKDSTYSLSSTLTLSKADYEKHKVYACEVT
HQGLSSPVTKSFNRGEC (DNA of HC)
SEQ ID NO: 14
CAGGTGCAGCTGGTGCAGTCTGGGGCTGAGGTGAAGAAGCCTGGGTCCT
CGGTGAAGGTCTCCTGCAAGGCTTCTGGAGGCACCTTCAGCAGCTATGC
TATCAGCTGGGTGCGACAGGCCCCTGGACAAGGGCTTGAGTGGATGGGA
GGGATCATCCCTATCTTTGGTACAGCAAACTACGCACAGAAGTTCCAGG
GCAGAGTCACGATTACCGCGGACGAATCCACGAGCACAGCCTACATGGA
GCTGAGCAGCCTGAGATCTGAGGACACGGCCGTGTATTACTGTGCGAGA
GATCTGATGACTACGGCCCCTGGGACGTACTTCGATCTCTGGGGCCGTG
GCACCCTGGTCACTGTCTCCTCAGCTAGCACCAAGGGCCCATCGGTCTT
CCCCCTGGCACCCTCCTCCAAGAGCACCTCTGGGGGCACAGCGGCCCTG
GGCTGCCTGGTCAAGGACTACTTCCCCGAACCGGTGACGGTGTCGTGGA
ACTCAGGCGCACTGACCAGCGGCGTGCACACCTTCCCGGCTGTCCTACA
GTCCTCAGGACTCTACTCCCTCAGCAGCGTGGTGACCGTGCCCTCCAGC
AGCTTGGGCACCCAGACCTACATCTGCAACGTGAATCACAAGCCCAGCA
ACACCAAGGTGGACAAGAGAGTTGAGCCCAAATCTTGTGACAAAACTCA
CACATGCCCACCGTGCCCAGCACCTGAAGCCGAGGGGGCACCGTCAGTC
TTCCTCTTCCCCCCAAAACCCAAGGACACCCTCATGATCTCCCGGACCC
CTGAGGTCACATGCGTGGTGGTGGACGTGAGCCACGAAGACCCTGAGGT
CAAGTTCAACTGGTATGTGGACGGCGTGGAGGTGCATAATGCCAAGACA
AAGCCGCGGGAGGAGCAGTACAACAGCACGTACCGTGTGGTCAGCGTCC
TCACCGTCCTGCACCAAGACTGGCTGAATGGCAAGGAGTACAAGTGCAA
GGTCTCCAACAAAGCCCTCCCATCCTCCATCGAGAAAACCATCTCCAAA
GCCAAAGGGCAGCCCCGAGAACCACAGGTGTACACCCTGCCCCCATCCC
GGGAGGAGATGACCAAGAACCAAGTCAGCCTGACCTGCCTGGTCAAAGG
CTTCTATCCCAGCGACATCGCCGTGGAGTGGGAGAGCAATGGGCAGCCG
GAGAACAACTACAAGACCACGCCTCCCGTGCTGGACTCCGACGGCTCCT
TCTTCCTCTATTCCAAGCTCACCGTGGACAAGAGCAGGTGGCAGCAGGG
GAACGTCTTCTCATGCTCCGTGATGCATGAGGCTCTGCACAACCACTAC
ACGCAGAAGAGCCTCTCCCTGTCTCCGGGCAAATGA (DNA of LC of Antibody A1)
SEQ ID NO: 15
ATGAGGCTGCTGCCTCTGCTGGCCCTCCTGGCCCTGTGGGGCCCAGACC
CAGCCAGAGCCGCCATCCGGATGACCCAGTCTCCACCCTCCCTGTCTGC
ATCTGTAGGAGACAGAGTCACCATCACTTGCCAGGCGAGTCAGGACATT
GGCAACTCTTTAGGTTGGTATCAGCAGAAACCAGGGAAAGCCCCTAAAC
TCGTGATCTTCGATGCATCAGATCTGGAAACAGGGGTCCCATCAAGGTT
CAGTGGCAGTGGATCTGGCACAGATTTCAGTCTCACCATCAGCAGCCTG
CAGCCTGAGGATTTTGCAACTTACTATTGTCAACAGGGTAACAGTTTCC
CGCTCACCTTCGGCCAAGGGACACGACTGGAGATTAAACGAACTGCCTC
TGTTGTGTGCCTGCTGAATAACTTCTATCCCAGAGAGGCCAAAGTACAG
TGGAAGGTGGATAACGCCCTCCAATCGGGTAACTCCCAGGAGAGTGTCA
CAGAGCAGGACAGCAAGGACAGCACCTACAGCCTCAGCAGCACCCTGAC
GCTGAGCAAAGCAGACTACGAGAAACACAAAGTCTACGCCTGCGAAGTC
ACCCATCAGGGCCTGAGCTCGCCCGTCACAAAGAGCTTCAACAGGGGAG
AGTGTTAG (DNA of LC of Antibody A2)
SEQ ID NO: 16
ATGGAGACAGACACACTCCTGCTATGGGTACTGCTGCTCTGGGTTCCAG
GCTCCACCGGCATCCGGATGACCCAGTCTCCACCCTCCCTGTCTGCATC
TGTAGGAGACAGAGTCACCATCACTTGCCAGGCGAGTCAGGACATTGGC
AACTCTTTAGGTTGGTATCAGCAGAAACCAGGGAAAGCCCCTAAACTCG
TGATCTTCGATGCATCAGATCTGGAAACAGGGGTCCCATCAAGGTTCAG
TGGCAGTGGATCTGGCACAGATTTCAGTCTCACCATCAGCAGCCTGCAG
CCTGAGGATTTTGCAACTTACTATTGTCAACAGGGTAACAGTTTCCCGC

TCACCTTCGGCCAAGGGACACGACTGGAGATTAAACGAACTGTGGCCGC

ACCATCTGTCTTCATCTTCCCGCCATCTGATGAGCAGTTGAAATCTGGA

ACTGCCTCTGTTGTGTGCCTGCTGAATAACTTCTATCCCAGAGAGGCCA

AAGTACAGTGGAAGGTGGATAACGCCCTCCAATCGGGTAACTCCCAGGA

GAGTGTCACAGAGCAGGACAGCAAGGACAGCACCTACAGCCTCAGCAGC

ACCCTGACGCTGAGCAAAGCAGACTACGAGAAACACAAAGTCTACGCCT

GCGAAGTCACCCATCAGGGCCTGAGCTCGCCCGTCACAAAGAGCTTCAA

CAGGGGAGAGTGTTAG (DNA of LC of Antibody A1/2)

SEQ ID NO: 17

ATGGAGACAGACACACTCCTGCTATGGGTACTGCTGCTCTGGGTTCCAG

GCTCCACCGGCGCCATCCGGATGACCCAGTCTCCACCCTCCCTGTCTGC

ATCTGTAGGAGACAGAGTCACCATCACTTGCCAGGCGAGTCAGGACATT

GGCAACTCTTTAGGTTGGTATCAGCAGAAACCAGGGAAAGCCCCTAAAC

TCGTGATCTTCGATGCATCAGATCTGGAAACAGGGGTCCCATCAAGGTT

CAGTGGCAGTGGATCTGGCACAGATTTCAGTCTCACCATCAGCAGCCTG

CAGCCTGAGGATTTTGCAACTTACTATTGTCAACAGGGTAACAGTTTCC

CGCTCACCTTCGGCCAAGGGACACGACTGGAGATTAAACGAACTGTGGC

TGCACCATCTGTCTTCATCTTCCCGCCATCTGATGAGCAGTTGAAATCT

GGAACTGCCTCTGTTGTGTGCCTGCTGAATAACTTCTATCCCAGAGAGG

CCAAAGTACAGTGGAAGGTGGATAACGCCCTCCAATCGGGTAACTCCCA

GGAGAGTGTCACAGAGCAGGACAGCAAGGACAGCACCTACAGCCTCAGC

AGCACCCTGACGCTGAGCAAAGCAGACTACGAGAAACACAAAGTCTACG

CCTGCGAAGTCACCCATCAGGGCCTGAGCTCGCCCGTCACAAAGAGCTT

CAACAGGGGAGAGTGTTAG (HC of BMS20H4.9)

SEQ ID NO: 18

QVQLQQWGAGLLKPSETLSLTCAVYGGSFSGYYWSWIRQSPEKGLEWIG

EINHGGYVTYNPSLESRVTISVDTSKNQFSLKLSSVTAADTAVYYCARD

YGPGNYDWYFDLWGRGTLVTVSSASTKGPSVFPLAPCSRSTSESTAALG

CLVKDYFPEPVTVSWNSGALTSGVHTFPAVLQSSGLYSLSSVVTVPSSS

LGTKTYTCNVDHKPSNTKVDKRVESKYGPPCPPCPAPEFLGGPSVFLFP

PKPKDTLMISRTPEVTCVVVDVSQEDPEVQFNWYVDGVEVHNAKTKPRE

EQFNSTYRVVSVLTVLHQDWLNGKEYKCKVSNKGLPSSIEKTISKAKGQ

PREPQVYTLPPSQEEMTKNQVSLTCLVKGFYPSDIAVEWESNGQPENNY

KTTPPVLDSDGSFFLYSRLTVDKSRWQEGNVFSCSVMHEALHNHYTQKS

LSLSLGK (LC of BMS20H4.9)

SEQ ID NO: 19

EIVLTQSPATLSLSPGERATLSCRASQSVSSYLAWYQQKPGQAPRLLIY

DASNRATGIPARFSGSGSGTDFTLTISSLEPEDFAVYYCQQRSNWPPAL

TFGGGTKVEIKRTVAAPSVFIFPPSDEQLKSGTASVVCLLNNFYPREAK

VQWKVDNALQSGNSQESVTEQDSKDSTYSLSSTLTLSKADYEKHKVYAC

EVTHQGLSSPVTKSFNRGEC (HC of PF83)

SEQ ID NO: 20

EVQLVQSGAEVKKPGESLRISCKGSGYSFSTYWISWVRQMPGKGLEWMG

KIYPGDSYTNYSPSFQGQVTISADKSISTAYLQWSSLKASDTAMYYCAR

GYGIFDYWGQGTLVTVSSASTKGPSVFPLAPCSRSTSESTAALGCLVKD

YFPEPVTVSWNSGALTSGVHTFPAVLQSSGLYSLSSVVTVPSSNFGTQT

YTCNVDHKPSNTKVDKTVERKCCVECPPCPAPPVAGPSVFLFPPKPKDT

LMISRTPEVTCVVVDVSHEDPEVQFNWYVDGVEVHNAKTKPREEQFNST

FRVVSVLTVVHQDWLNGKEYKCKVSNKGLPAPIEKTISKTKGQPREPQV

YTLPPSREEMTKNQVSLTCLVKGFYPSDIAVEWESNGQPEMETDTLLLW

VLLLWVPGSTGAIRMTQSPPSLSASVGDRVTITCQASQDIGNSLGWYQQ

KPGKAPKLVIFDASDLETGVPSRFSGSGSGTDFSLTISSLQPEDFATYY

CQQGNSFPLTFGQGTRLEIKRTVAAPSVFIFPPSDEQLKSGTASVVCLL

NNFYPREAKVQWKVDNALQSGNSQESVTEQDSKDSTYSLSSTLTLSKAD

YEKHKVYACEVTHQGLSSPVTKSFNRGECNNYKTTPPMLDSDGSFFLYS

KLTVDKSRWQQGNVFSCSVMHEALHNHYTQKSLSLSPGK (LC of PF83)

SEQ ID NO: 21

SYELTQPPSVSVSPGQTASITCSGDNIGDQYAHWYQQKPGQSPVLVIYQ

DKNRPSGIPERFSGSNSGNTATLTISGTQAMDEADYYCATYTGFGSLAV

FGGGTKLTVLGQPKAAPSVTLFPPSSEELQANKATLVCLISDFYPGAVT

VAWKADSSPVKAGVETTTPSKQSNNKYAASSYLSLTPEQWKSHRSYSCQ

VTHEGSTVEKTVAPTECS

---

We claim:

1. A method of treating cancer in a subject in need thereof, the method comprising administering to the subject an effective amount of an anti-human CD137 antibody comprising a heavy chain variable region and a light chain variable region; wherein the heavy chain variable region comprises a HCDR1 having the amino acid sequence of SEQ ID NO: 2, a HCDR2 having the amino acid sequence of SEQ ID NO: 3, and a HCDR3 having the amino acid sequence of SEQ ID NO: 4; wherein the light chain variable region comprises a LCDR1 having the amino acid sequence of SEQ ID NO: 5, a LCDR2 having the amino acid sequence of SEQ ID NO: 6, and a LCDR3 having the amino acid sequence of SEQ ID NO: 7.

2. The method of claim 1, wherein the antibody contacts amino acid residues 55, 59, 63, 66, 72, 93-103, and 112-116 of human CD137 as set forth in SEQ ID NO: 1, and wherein the amino acid residues in contact are within six (6) angstroms or less of the antibody.

3. The method of claim 1, wherein the antibody comprises a heavy chain having the amino acid sequence of SEQ ID NO: 10 and a light chain having the amino acid sequence of SEQ ID NO: 11.

4. The method of claim 1, wherein the antibody comprises a heavy chain having the amino acid sequence of SEQ ID NO: 10 and a light chain having the amino acid sequence of SEQ ID NO: 13.

5. The method of claim 1, wherein the cancer is adenocarcinoma or squamous cell carcinoma.

6. The method of claim 1, wherein the cancer is bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

7. The method of claim 1, wherein the cancer is at least one of:

adenocarcinoma or squamous cell carcinoma;

and at least one of: bladder cancer, breast cancer, biliary tract cancer, colon cancer, endometrial cancer, esophageal cancer, gastric cancer, head and neck cancer, non-small cell lung cancer, prostate cancer, rectal cancer, or thyroid cancer.

8. The method of claim 1, wherein the cancer is cholangiocarcinoma, head and neck squamous cell carcinoma, lung adenocarcinoma, lung squamous cell carcinoma, or clear cell renal carcinoma.

9. The method of claim 1, wherein the cancer is bladder cancer, head and neck squamous cell carcinoma, or renal cell carcinoma.

10. The method of claim 1, wherein the cancer is a solid tumor, and the tumor is infiltrated with $CD137^+$ lymphocytes.

11. The method of claim 1, wherein the antibody is administered in combination with ionizing radiation.

12. The method of claim 1, wherein the antibody is administered in combination with one or more chemotherapeutic agents.

13. The method of claim 12, wherein the antibody is administered simultaneously, separately, or sequentially with the one or more chemotherapeutic agents.

* * * * *

SEQUENCE LISTING

```
Sequence total quantity: 21
SEQ ID NO: 1            moltype = AA   length = 232
FEATURE                 Location/Qualifiers
source                  1..232
                        mol_type = protein
                        organism = Homo sapiens
SEQUENCE: 1
LQDPCSNCPA GTFCDNNRNQ ICSPCPPNSF SSAGGQRTCD ICRQCKGVFR TRKECSSTSN   60
AECDCTPGFH CLGAGCSMCE QDCKQGQELT KKGCKDCCFG TFNDQKRGIC RPWTNCSLDG  120
KSVLVNGTKE RDVVCGPSPA DLSPGASSVT PPAPAREPGH SPQIISFFLA LTSTALLFLL  180
FFLTLRFSVV KRGRKKLLYI FKQPFMRPVQ TTQEEDGCSC RFPEEEGGC EL           232
```

```
SEQ ID NO: 2               moltype = AA  length = 13
FEATURE                    Location/Qualifiers
REGION                     1..13
                           note = Synthetic Construct
source                     1..13
                           mol_type = protein
                           organism = synthetic construct
SEQUENCE: 2
KASGGTFSSY AIS                                                                 13

SEQ ID NO: 3               moltype = AA  length = 17
FEATURE                    Location/Qualifiers
REGION                     1..17
                           note = Synthetic Construct
source                     1..17
                           mol_type = protein
                           organism = synthetic construct
SEQUENCE: 3
GIIPIFGTAN YAQKFQG                                                             17

SEQ ID NO: 4               moltype = AA  length = 15
FEATURE                    Location/Qualifiers
REGION                     1..15
                           note = Synthetic Construct
source                     1..15
                           mol_type = protein
                           organism = synthetic construct
SEQUENCE: 4
ARDLMTTAPG TYFDL                                                               15

SEQ ID NO: 5               moltype = AA  length = 11
FEATURE                    Location/Qualifiers
REGION                     1..11
                           note = Synthetic Construct
source                     1..11
                           mol_type = protein
                           organism = synthetic construct
SEQUENCE: 5
QASQDIGNSL G                                                                   11

SEQ ID NO: 6               moltype = AA  length = 8
FEATURE                    Location/Qualifiers
REGION                     1..8
                           note = Synthetic Construct
source                     1..8
                           mol_type = protein
                           organism = synthetic construct
SEQUENCE: 6
FDASDLET                                                                        8

SEQ ID NO: 7               moltype = AA  length = 9
FEATURE                    Location/Qualifiers
REGION                     1..9
                           note = Synthetic Construct
source                     1..9
                           mol_type = protein
                           organism = synthetic construct
SEQUENCE: 7
QQGNSFPLT                                                                       9

SEQ ID NO: 8               moltype = AA  length = 120
FEATURE                    Location/Qualifiers
REGION                     1..120
                           note = Synthetic Construct
source                     1..120
                           mol_type = protein
                           organism = synthetic construct
SEQUENCE: 8
QVQLVQSGAE VKKPGSSVKV SCKASGGTFS SYAISWVRQA PGQGLEWMGG IIPIFGTANY               60
AQKFQGRVTI TADESTSTAY MELSSLRSED TAVYYCARDL MTTAPGTYFD LWGRGTLVTV              120

SEQ ID NO: 9               moltype = AA  length = 107
FEATURE                    Location/Qualifiers
REGION                     1..107
                           note = Sythetic Construct
source                     1..107
                           mol_type = protein
                           organism = synthetic construct
SEQUENCE: 9
```

```
AIRMTQSPPS LSASVGDRVT ITCQASQDIG NSLGWYQQKP GKAPKLVIFD ASDLETGVPS    60
RFSGSGSGTD FSLTISSLQP EDFATYYCQQ GNSFPLTFGQ GTRLEIK                107

SEQ ID NO: 10          moltype = AA   length = 452
FEATURE                Location/Qualifiers
REGION                 1..452
                       note = Synthetic Construct
source                 1..452
                       mol_type = protein
                       organism = synthetic construct
SEQUENCE: 10
QVQLVQSGAE VKKPGSSVKV SCKASGGTFS SYAISWVRQA PGQGLEWMGG IIPIFGTANY    60
AQKFQGRVTI TADESTSTAY MELSSLRSED TAVYYCARDL MTTAPGTYFD LWGRGTLVTV   120
SSASTKGPSV FPLAPSSKST SGGTAALGCL VKDYFPEPVT VSWNSGALTS GVHTFPAVLQ   180
SSGLYSLSSV VTVPSSSLGT QTYICNVNHK PSNTKVDKRV EPKSCDKTHT CPPCPAPEAE   240
GAPSVFLFPP KPKDTLMISR TPEVTCVVVD VSHEDPEVKF NWYVDGVEVH NAKTKPREEQ   300
YNSTYRVVSV LTVLHQDWLN GKEYKCKVSN KALPSSIEKT ISKAKGQPRE PQVYTLPPSR   360
EEMTKNQVSL TCLVKGFYPS DIAVEWESNG QPENNYKTTP PVLDSDGSFF LYSKLTVDKS   420
RWQQGNVFSC SVMHEALHNH YTQKSLSLSP GK                                452

SEQ ID NO: 11          moltype = AA   length = 214
FEATURE                Location/Qualifiers
REGION                 1..214
                       note = Synthetic Construct
source                 1..214
                       mol_type = protein
                       organism = synthetic construct
SEQUENCE: 11
AIRMTQSPPS LSASVGDRVT ITCQASQDIG NSLGWYQQKP GKAPKLVIFD ASDLETGVPS    60
RFSGSGSGTD FSLTISSLQP EDFATYYCQQ GNSFPLTFGQ GTRLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                              214

SEQ ID NO: 12          moltype = AA   length = 106
FEATURE                Location/Qualifiers
REGION                 1..106
                       note = Synthetic Construct
source                 1..106
                       mol_type = protein
                       organism = synthetic construct
SEQUENCE: 12
IRMTQSPPSL SASVGDRVTI TCQASQDIGN SLGWYQQKPG KAPKLVIFDA SDLETGVPSR    60
FSGSGSGTDF SLTISSLQPE DFATYYCQQG NSFPLTFGQG TRLEIK                 106

SEQ ID NO: 13          moltype = AA   length = 213
FEATURE                Location/Qualifiers
REGION                 1..213
                       note = Synthetic Construct
source                 1..213
                       mol_type = protein
                       organism = synthetic construct
SEQUENCE: 13
IRMTQSPPSL SASVGDRVTI TCQASQDIGN SLGWYQQKPG KAPKLVIFDA SDLETGVPSR    60
FSGSGSGTDF SLTISSLQPE DFATYYCQQG NSFPLTFGQG TRLEIKRTVA APSVFIFPPS   120
DEQLKSGTAS VVCLLNNFYP REAKVQWKVD NALQSGNSQE SVTEQDSKDS TYSLSSTLTL   180
SKADYEKHKV YACEVTHQGL SSPVTKSFNR GEC                               213

SEQ ID NO: 14          moltype = DNA   length = 1359
FEATURE                Location/Qualifiers
misc_feature           1..1359
                       note = Synthetic Construct
source                 1..1359
                       mol_type = other DNA
                       organism = synthetic construct
SEQUENCE: 14
caggtgcagc tggtgcagtc tggggctgag gtgaagaagc ctgggtcctc ggtgaaggtc    60
tcctgcaagg cttctggagg cacccttcagc agctatgcta tcagctgggt gcgacaggcc   120
cctggacaag ggcttgagtg gatgggaggg atcatcccta tctttggtac agcaaactac   180
gcacagaagt tccagggcag agtcacgatt accgcggacg aatccacgag cacagcctac   240
atggagctga gcagcctgag atctgaggac acggccgtgt attactgtgc gagagatctg   300
atgactacgg cccctgggac gtacttcgat ctctggggcc gtggcaccct ggtcactgtc   360
tcctcagcta gcaccaaggg cccatcggtc ttccccctgg cacctcctc caagagcacc   420
tctgggggca gcggccct gggctgcctg gtcaaggact acttccccga accggtgacg   480
gtgtcgtgga actcaggcgc actgaccagc ggcgtgcaca ccttcccggc tgtcctacag   540
tcctcaggac tctactccct cagcagcgtg gtgaccgtgc cctccagcag cttgggcacc   600
cagacctaca tctgcaacgt gaatcacaag cccagcaaca ccaaggtgga caagagagtt   660
gagcccaaat cttgtgacaa aactcacaca tgcccaccgt gcccagcacc tgaagccgag   720
gggggaccgt cagtcttcct cttccccccaa aaacccaagg acaccctcat gatctcccgg   780
acccctgagg tcacatgcgt ggtggtggac gtgagccacg aagaccctga ggtcaagttc   840
```

```
aactggtatg tggacggcgt ggaggtgcat aatgccaaga caaagccgcg ggaggagcag    900
tacaacagca cgtaccgtgt ggtcagcgtc ctcaccgtcc tgcaccaaga ctggctgaat    960
ggcaaggagt acaagtgcaa ggtctccaac aaagccctcc catcctccat cgagaaaacc   1020
atctccaaag ccaagggcag gccccgagaa ccacaggtgt acaccctgcc cccatcccgg   1080
gaggagatga ccaagaacca agtcagcctg acctgcctgg tcaaaggctt ctatcccagc   1140
gacatcgccg tggagtggga gagcaatggg cagccggaga caactacaa gaccacgcct    1200
cccgtgctgg actccgacgg ctccttcttc ctctattcca agctcaccgt ggacaagagc   1260
aggtggcagc aggggaacgt cttctcatgc tccgtgatgc atgaggctct gcacaaccac   1320
tacacgcaga gagcctctc cctgtctccg ggcaaatga                           1359

SEQ ID NO: 15         moltype = DNA  length = 645
FEATURE               Location/Qualifiers
misc_feature          1..645
                      note = Synthetic Construct
source                1..645
                      mol_type = other DNA
                      organism = synthetic construct
SEQUENCE: 15
atgaggctgc tgcctctgct ggccctcctg gccctgtggg gcccagaccc agccagagcc     60
gccatccgga tgacccagtc tccaccctcc ctgtctgcat ctgtaggaga cagagtcacc    120
atcacttgcc aggcgagtca ggacattggc aactctttag ttggtatca gcagaaacca    180
gggaaagccc ctaaactcgt gatcttcgat gcatcagaa tggaaacagg ggtcccatca    240
aggttcagtg gcagtggatc tggcacagat ttcagtctca ccatcagcag cctgcagcct    300
gaggattttg caacttacta ttgtcaacag ggtaacagtt tcccgctcac cttcggccaa    360
gggacacgac tggagattaa acgaactgcc tctgttgtgt gcctgctgaa taacttctat   420
cccagagagg ccaaagtaca gtggaaggtg gataacgccc tccaatcggg taactcccag    480
gagagtgtca cagagcagga cagcaaggac agcacctaca gcctcagcag caccctgacg    540
ctgagcaaag cagactacga gaaacacaaa gtctacgcct gcgaagtcac ccatcagggc    600
ctgagctcgc ccgtcacaaa gagcttcaac aggggagagt gttag                   645

SEQ ID NO: 16         moltype = DNA  length = 702
FEATURE               Location/Qualifiers
misc_feature          1..702
                      note = Synthetic Construct
source                1..702
                      mol_type = other DNA
                      organism = synthetic construct
SEQUENCE: 16
atggagacag acacactcct gctatgggta ctgctgctct gggttccagg ctccaccggc     60
atccggatga cccagtctcc accctccctg tctgcatctg taggagacag agtcaccatc    120
acttgccagg cgagtcagga cattggcaac tctttaggtt ggtatcagca gaaaccaggg    180
aaagcccta aactcgtgat cttcgatgca tcagatctgg aaacaggggt cccatcaagg    240
ttcagtggca gtggatctgg cacagatttc agtctcacca tcagcagcct gcagcctgag    300
gattttgcaa cttactattg tcaacagggt aacagtttcc cgctcacctt cggcaaggg    360
acacgactgg agattaaacg aactgtggcc gcaccatctg tcttcatctt cccgccatct   420
gatgagcagt tgaaatctgg aactgcctct gttgtgtgcc tgctgaataa cttctatccc   480
agagaggcca aagtacagtg gaaggtggat aacgccctcc aatcgggtaa ctcccaggag    540
agtgtcacag agcaggacag caaggacagc acctacagcc tcagcagcac cctgacgctg    600
agcaaagcag actacgagaa acacaaagtc tacgcctgcg aagtcaccca tcagggcctg    660
agctcgcccg tcacaaagag cttcaacagg ggagagtgtt ag                       702

SEQ ID NO: 17         moltype = DNA  length = 705
FEATURE               Location/Qualifiers
misc_feature          1..705
                      note = Synthetic Construct
source                1..705
                      mol_type = other DNA
                      organism = synthetic construct
SEQUENCE: 17
atggagacag acacactcct gctatgggta ctgctgctct gggttccagg ctccaccggc     60
gccatccgga tgacccagtc tccaccctcc ctgtctgcat ctgtaggaga cagagtcacc    120
atcacttgcc aggcgagtca ggacattggc aactctttag ttggtatca gcagaaacca    180
gggaaagccc taaactcgt gatcttcgat gcatcagatc tggaaacagg ggtcccatca   240
aggttcagtg gcagtggatc tggcacagat ttcagtctca ccatcagcag cctgcagcct    300
gaggattttg caacttacta ttgtcaacag ggtaacagtt tcccgctcac cttcggccaa    360
gggacacgac tggagattaa acgaactgtg gctgcaccat ctgtcttcat cttcccgcca   420
tctgatgagc agttgaaatc tggaactgcc tctgttgtgt gcctgctgaa taacttctat   480
cccagagagg ccaaagtaca gtggaaggtg gataacgccc tccaatcggg taactcccag    540
gagagtgtca cagagcagga cagcaaggac agcacctaca gcctcagcag caccctgacg    600
ctgagcaaag cagactacga gaaacacaaa gtctacgcct gcgaagtcac ccatcagggc    660
ctgagctcgc ccgtcacaaa gagcttcaac aggggagagt gttag                   705

SEQ ID NO: 18         moltype = AA  length = 448
FEATURE               Location/Qualifiers
REGION                1..448
                      note = Synthetic
source                1..448
                      mol_type = protein
                      organism = synthetic construct
```

```
SEQUENCE: 18
QVQLQQWGAG LLKPSETLSL TCAVYGGSFS GYYWSWIRQS PEKGLEWIGE INHGGYVTYN    60
PSLESRVTIS VDTSKNQFSL KLSSVTAADT AVYYCARDYG PGNYDWYFDL WGRGTLVTVS   120
SASTKGPSVF PLAPCSRSTS ESTAALGCLV KDYFPEPVTV SWNSGALTSG VHTFPAVLQS   180
SGLYSLSSVV TVPSSSLGTK TYTCNVDHKP SNTKVDKRVE SKYGPPCPPC PAPEFLGGPS   240
VFLFPPKPKD TLMISRTPEV TCVVVDVSQE DPEVQFNWYV DGVEVHNAKT KPREEQFNST   300
YRVVSVLTVL HQDWLNGKEY KCKVSNKGLP SSIEKTISKA KGQPREPQVY TLPPSQEEMT   360
KNQVSLTCLV KGFYPSDIAV EWESNGQPEN NYKTTPPVLD SDGSFFLYSR LTVDKSRWQE   420
GNVFSCSVMH EALHNHYTQK SLSLSLGK                                     448

SEQ ID NO: 19           moltype = AA  length = 216
FEATURE                 Location/Qualifiers
REGION                  1..216
                        note = synthetic
source                  1..216
                        mol_type = protein
                        organism = synthetic construct
SEQUENCE: 19
EIVLTQSPAT LSLSPGERAT LSCRASQSVS SYLAWYQQKP GQAPRLLIYD ASNRATGIPA    60
RFSGSGSGTD FTLTISSLEP EDFAVYYCQQ RSNWPPALTF GGGTKVEIKR TVAAPSVFIF   120
PPSDEQLKSG TASVVCLLNN FYPREAKVQW KVDNALQSGN SQESVTEQDS KDSTYSLSST   180
LTLSKADYEK HKVYACEVTH QGLSSPVTKS FNRGEC                            216

SEQ ID NO: 20           moltype = AA  length = 442
FEATURE                 Location/Qualifiers
REGION                  1..442
                        note = synthetic
source                  1..442
                        mol_type = protein
                        organism = synthetic construct
SEQUENCE: 20
EVQLVQSGAE VKKPGESLRI SCKGSGYSFS TYWISWVRQM PGKGLEWMGK IYPGDSYTNY    60
SPSFQGQVTI SADKSISTAY LQWSSLKASD TAMYYCARGY GIFDYWGQGT LVTVSSASTK   120
GPSVFPLAPC SRSTSESTAA LGCLVKDYFP EPVTVSWNSG ALTSGVHTFP AVLQSSGLYS   180
LSSVVTVPSS NFGTQTYTCN VDHKPSNTKV DKTVERKCCV ECPPCPAPPV AGPSVFLFPP   240
KPKDTLMISR TPEVTCVVVD VSHEDPEVQF NWYVDGVEVH NAKTKPREEQ FNSTFRVVSV   300
LTVVHQDWLN GKEYKCKVSN KGLPAPIEKT ISKTKGQPRE PQVYTLPPSR EEMTKNQVSL   360
TCLVKGFYPS DIAVEWESNG QPENNYKTTP PMLDSDGSFF LYSKLTVDKS RWQQGNVFSC   420
SVMHEALHNH YTQKSLSLSP GK                                            442

SEQ ID NO: 21           moltype = AA  length = 214
FEATURE                 Location/Qualifiers
REGION                  1..214
                        note = synthetic
source                  1..214
                        mol_type = protein
                        organism = synthetic construct
SEQUENCE: 21
SYELTQPPSV SVSPGQTASI TCSGDNIGDQ YAHWYQQKPG QSPVLVIYQD KNRPSGIPER    60
FSGSNSGNTA TLTISGTQAM DEADYYCATY TGFGSLAVFG GGTKLTVLGQ PKAAPSVTLF   120
PPSSEELQAN KATLVCLISD FYPGAVTVAW KADSSPVKAG VETTTPSKQS NNKYAASSYL   180
SLTPEQWKSH RSYSCQVTHE GSTVEKTVAP TECS                              214
```